US011114962B2

(12) United States Patent  (10) Patent No.: US 11,114,962 B2
Narumi  (45) Date of Patent: Sep. 7, 2021

(54) SEMICONDUCTOR DEVICE, MOTOR DRIVE SYSTEM, AND MOTOR CONTROL PROGRAM

(71) Applicant: RENESAS ELECTRONICS CORPORATION, Tokyo (JP)

(72) Inventor: Satoshi Narumi, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 260 days.

(21) Appl. No.: 16/289,285

(22) Filed: Feb. 28, 2019

(65) Prior Publication Data

US 2019/0319562 A1  Oct. 17, 2019

(30) Foreign Application Priority Data

Apr. 13, 2018 (JP) .............................. JP2018-077627

(51) Int. Cl.
*H02P 6/182* (2016.01)
*H02P 6/28* (2016.01)
*H02M 7/5387* (2007.01)

(52) U.S. Cl.
CPC ........ *H02P 6/182* (2013.01); *H02M 7/53873* (2013.01); *H02P 6/28* (2016.02)

(58) Field of Classification Search
CPC .................................. H02P 6/182; H02P 6/28
USPC .............................. 318/400.26, 400.01, 700
See application file for complete search history.

(56) References Cited

U.S. PATENT DOCUMENTS

| 6,369,534 | B1 | 4/2002 | Menegoli | |
| 6,737,828 | B2* | 5/2004 | Kiuchi | H02P 21/06 |
| | | | | 318/779 |
| 7,274,161 | B2* | 9/2007 | Mori | H02P 6/20 |
| | | | | 318/400.25 |
| 7,589,484 | B2 | 9/2009 | Sosseh et al. | |
| 7,847,498 | B2 | 12/2010 | Shibuya | |
| 7,982,425 | B2* | 7/2011 | Minamide | G05B 19/404 |
| | | | | 318/632 |
| 9,690,288 | B2 | 6/2017 | Kunida et al. | |
| 2004/0012355 | A1 | 1/2004 | Sosseh et al. | |
| 2006/0082336 | A1 | 4/2006 | Kurosawa et al. | |

(Continued)

FOREIGN PATENT DOCUMENTS

JP   2014-113057 A   6/2014
JP   2015-226450 A   12/2015

OTHER PUBLICATIONS

Extended European Search Report issued in corresponding European Patent Application Na 19165690.9-1202, dated Aug. 13, 2019.

(Continued)

*Primary Examiner* — David Luo
(74) *Attorney, Agent, or Firm* — McDermott Will & Emery LLP

(57) ABSTRACT

The present disclosure starts up a three-phase motor in a stable manner. During a start-up operation of a brushless DC motor, a motor drive system detects the position of a particularly suitable rotor while the rotor is resting, and applies a drive current to two phases in accordance with the detected position of the rotor. A controller changes the time of drive current application in accordance with the magnitude of back electromotive force that is in a non-conducting phase and detected by a detector during drive current application.

16 Claims, 16 Drawing Sheets

(56) References Cited

U.S. PATENT DOCUMENTS

2008/0018279 A1    1/2008  Fukamizu et al.

OTHER PUBLICATIONS

Japanese Notice of Reasons for Refusal issued in corresponding Japanese Patent Application No. 2018-077627, dated Jun. 29, 2021, with English translation.

* cited by examiner

ADVANCED BY 120-DEGREE ELECTRICAL ANGLE (t1)

ADVANCED BY 90-DEGREE ELECTRICAL ANGLE (t4)

0-DEGREE ELECTRICAL ANGLE (t8)

-30-DEGREE ELECTRICAL ANGLE (t9)

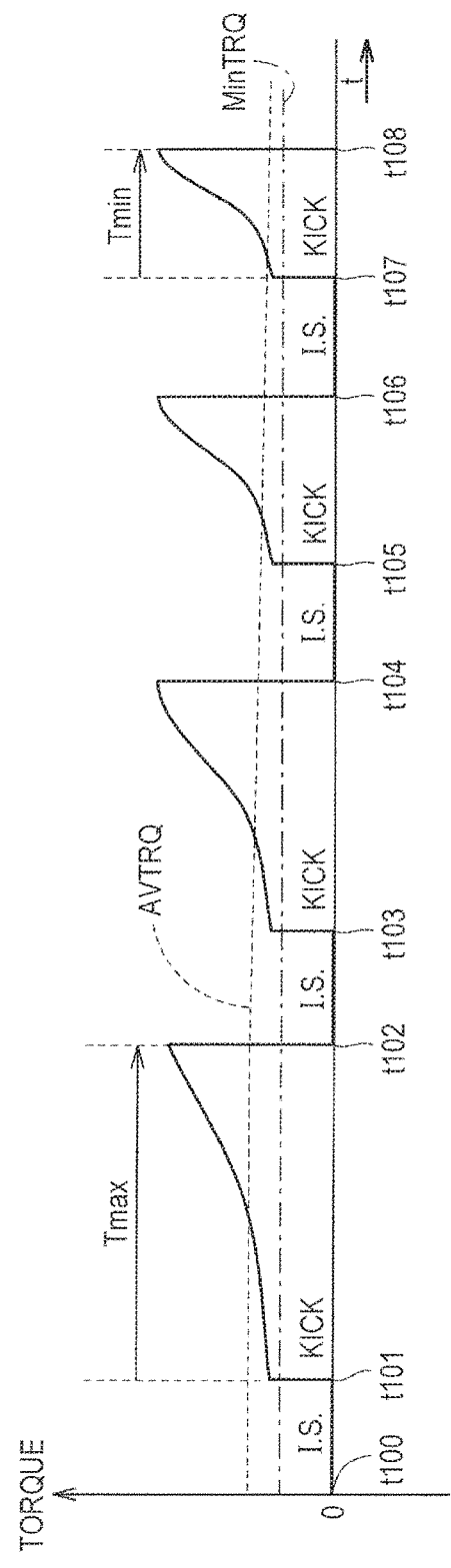
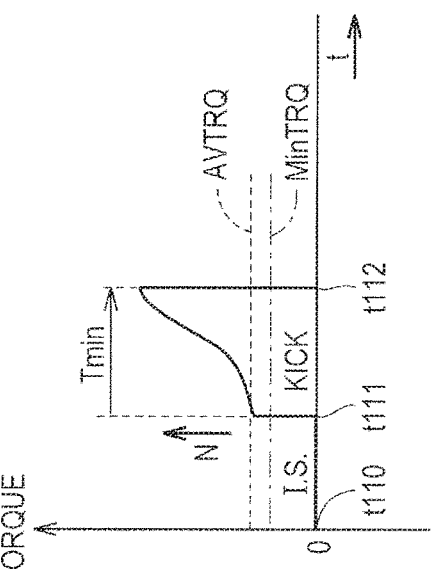
FIG. 10A
FIG. 10B

FIG. 15
| | STATOR AND ROTOR POSITIONS ○ BEMF DETECTION PHASE | DETECTED CURRENT (I.S.) | DRIVE CURRENT (KICK) | BEMF DETECTION |
|---|---|---|---|---|
| 1 | 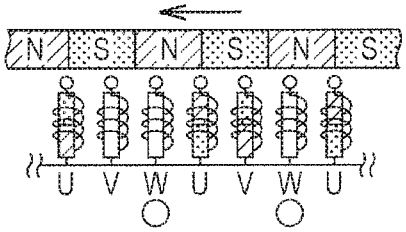 | d: V→W | f: U→V | 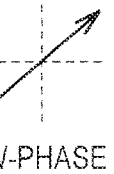 W-PHASE |
| 2 | 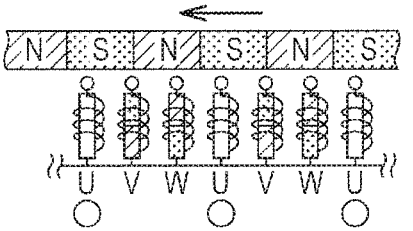 | e: U→W | a: W→V | 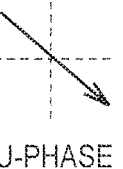 U-PHASE |
| 3 | 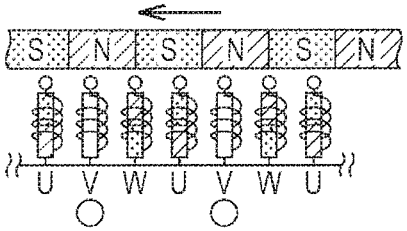 | f: U→V | b: W→U | 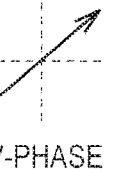 V-PHASE |
| 4 | 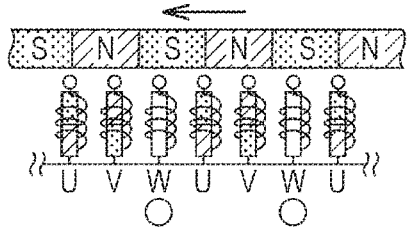 | a: W→V | c: V→U | 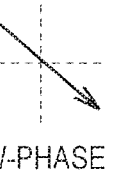 W-PHASE |
| 5 | 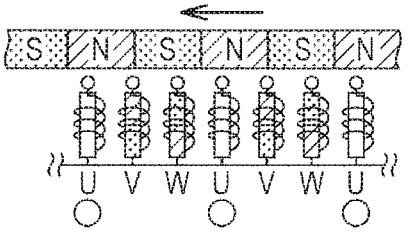 | b: W→U | d: V→W | 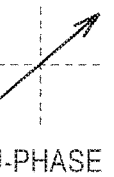 U-PHASE |
| 6 | 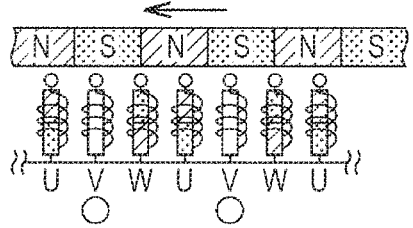 | c: V→U | e: U→W | 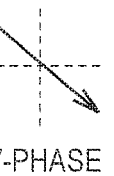 V-PHASE |

SEMICONDUCTOR DEVICE, MOTOR DRIVE SYSTEM, AND MOTOR CONTROL PROGRAM

CROSS-REFERENCE TO RELATED APPLICATIONS

The disclosure of Japanese Patent Application No. 2018-077627 filed on Apr. 13, 2018 including the specification, drawings and abstract is incorporated herein by reference in its entirety.

BACKGROUND

The present disclosure relates to a semiconductor device, a motor drive system, and a motor control program. For example, the present disclosure is suitably used to control a sensorless brushless DC motor (referred to also as a permanent magnet synchronous motor).

In sensorless control of a brushless DC motor, back electromotive force (BEMF) is generated in a stator winding in a non-conducting phase when a rotor of the motor rotates, and the relative position of a rotor pole pair with respect to the stator winding is estimated by detecting a zero-crossing point where the back electromotive force crosses a midpoint (virtual midpoint).

While the motor is stopped, no back electromotive force is generated. Therefore, the motor cannot be started up by exercising sensorless control based on the above-mentioned zero-crossing point of the back electromotive force. Consequently, for example, an inductive sensing or self-induced voltage detection method is often employed to detect the position of a stopped rotor (refer, for example, to Japanese Unexamined Patent Application Publication No. 2015-226450).

Initial torque is imparted to the motor when a drive voltage is applied, for a definite period of time, to the stator winding in an appropriate phase in accordance with the initial position of the rotor that is detected by the inductive sensing method. Under normal conditions, the detection of the initial position of the rotor and the application of the initial torque are handled as a set of operations and repeatedly executed multiple times. Subsequently, motor control transitions to sensorless control based on the zero-crossing point of the back electromotive force.

SUMMARY

In general motor control, a constant load torque is applied to a motor. Therefore, in a case where the initial torque is applied to a stopped motor, the magnitude of a drive current (or a drive voltage) and the time of its application may be fixed. However, if the time of application of the drive current is fixed in a case where the load torque applied to a motor used, for example, in an electric tool (referred to also as a power tool) is not constant, the motor may fail to start up in a stable manner.

Other problems and novel features will become apparent from the following description and from the accompanying drawings.

According to an aspect of the present disclosure, there is provided a motor drive system. During an operation performed to start up a three-phase motor, the motor drive system detects the position of a rotor, and applies a drive current to two out of three phases in accordance with the detected rotor position. A controller changes the time of application of the drive current in accordance with the magnitude of back electromotive force that is detected in a non-conducting phase when the drive current is applied.

According to the above aspect of the present disclosure, a three-phase motor can be started up in a stable manner even if the load torque is not constant.

BRIEF DESCRIPTION OF THE DRAWINGS

FIGS. 10A and 10B are diagrams illustrating temporal changes in motor torque during a start-up operation of a brushless DC motor in a motor drive system according to the first embodiment;

FIG. 15 is a diagram illustrating, in tabular form, voltage changes in a non-conducting phase in each of various current patterns.

DETAILED DESCRIPTION

Figure 1:
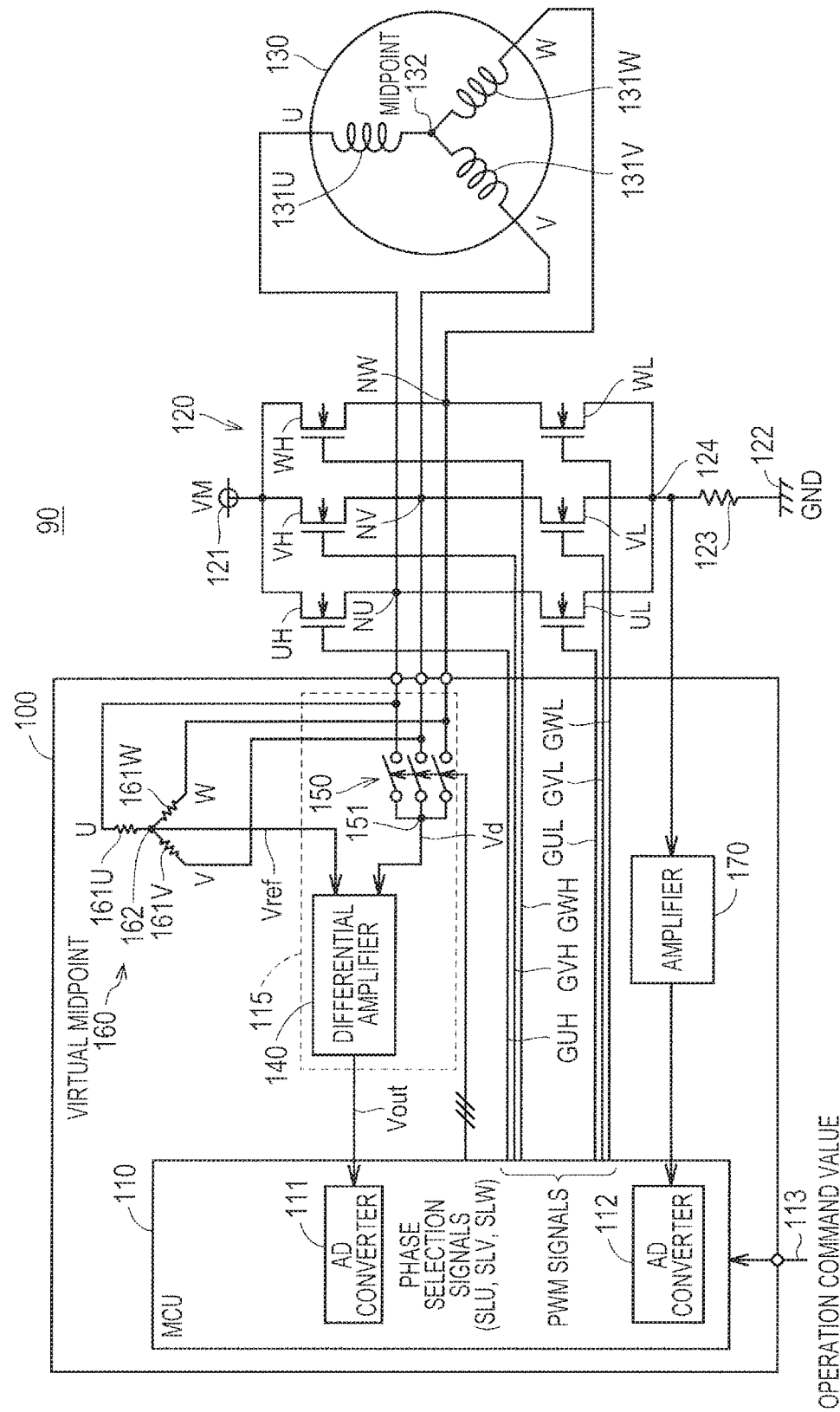
FIG. 1 is a block diagram illustrating an exemplary configuration of a motor drive system.

Embodiments of the present disclosure will now be described in detail with reference to the accompanying drawings. Identical or equivalent elements are designated by the same reference numerals and will not be redundantly described.

First Embodiment

Overall Configuration of Motor Drive System

FIG. 1 is a block diagram illustrating an exemplary configuration of a motor drive system 90. Referring to FIG.

1, the motor drive system 90 includes a three-phase brushless DC motor 130, an inverter circuit 120, and a semiconductor device 100. The semiconductor device 100 controls the inverter circuit 120.

(1. Brushless DC Motor)

The brushless DC motor 130 includes Y-coupled stator windings 131U, 131V, 131W and a rotor (not depicted) having one or more pole pairs. The rotor is rotatably driven in synchronism with a three-phase alternating current that is given from the inverter circuit 120 to the stator windings 131U, 131V, 131W. A node of the stator windings 131U, 131V, 131W is referred to as the midpoint 132.

(2. Inverter Circuit)

The inverter circuit 120 includes a U-phase upper arm MOS (metal oxide semiconductor) transistor UH, a U-phase lower arm MOS transistor UL, a V-phase upper arm MOS transistor VH, a V-phase lower arm MOS transistor VL, a W-phase upper arm MOS transistor WH, and a W-phase lower arm MOS transistor WL. The upper arm is referred to also as the high side, and the lower arm is referred to also as the low side.

The inverter circuit 120 further includes a shunt resistor 123 that detects a current between two phases.

Couplings of the above elements will now be briefly described. The MOS transistor UH and the MOS transistor UL are series-coupled in the order named between a first power supply node 121 and a low-potential coupling node 124. The first power supply node 121 gives a power supply voltage VM. The shunt resistor 123 is coupled between the coupling node 124 and a second power supply node 122. An output node NU is a coupling point between the MOS transistor UH and the MOS transistor UL, and coupled to one end of the U-phase stator winding 131U.

Similarly, the MOS transistor VH and the MOS transistor VL are series-coupled in the order named between the first power supply node 121 and the coupling node 124. An output node NV is a coupling point between the MOS transistor VH and the MOS transistor VL, and coupled to one end of the V-phase stator winding 131V.

Similarly, the MOS transistor WH and the MOS transistor WL are series-coupled in the order named between the first power supply node 121 and the coupling node 124. An output node NW is a coupling point between the MOS transistor WH and the MOS transistor WL, and coupled to one end of the W-phase stator winding 131W.

The MOS transistors UH, UL, VH, VL, WH, WL each include a body diode (not depicted). The body diodes of the MOS transistors are parallel-coupled in a reverse bias direction. Therefore, if the upper and lower arm transistors in the same phase are both off, a current can be regenerated through a path formed by the body diodes.

FIG. 1 indicates that all the MOS transistors UH, UL, VH, VL, WH, WL are formed of N-channel MOS transistors. Alternatively, however, either the upper arm MOS transistors UH, VH, WH or the lower arm MOS transistors UL, VL, WL may be formed of NMOS transistors while the remaining MOS transistors are formed of PMOS transistors. As another alternative, all the MOS transistors UH, UL, VH, VL, WH, WL may be formed of P-channel MOS transistors.

Further, instead of MOS transistors used as semiconductor switching elements included in the inverter circuit 120, for example, different types of field-effect transistors, bipolar transistors, or IGBTs (insulated gate bipolar transistors) may be used. However, when different types of transistors are used, flywheel diodes need to be inverse-parallel coupled to the transistors in order to allow a current to flow through a regeneration path in a case where the upper and lower arm transistors in the same phase are both off.

(3. Semiconductor Device)

The semiconductor device 100 includes a switch circuit 150, a virtual midpoint generation circuit 160, a differential amplifier 140, an amplifier 170, and a microcontroller unit (MCU) 110. The switch circuit 150 and the differential amplifier 140 form a detector 115 that detects a non-conducting phase output node voltage of the inverter circuit 120.

The switch circuit 150 is coupled to the output nodes NU, NV, NW. In accordance with phase selection signals SLU, SLV, SLW outputted from the MCU 110, the switch circuit 150 couples a detection node 151 to an output node in the selected phase, namely, the output node NU, NV, or NW.

The virtual midpoint generation circuit 160 gives a virtual midpoint 162 that has a voltage adapted to perform the same role as the midpoint 132 of the brushless DC motor 130. More specifically, the virtual midpoint generation circuit 160 includes a resistance element 161U coupled between the virtual midpoint 162 and the output node NU, a resistance element 161V coupled between the virtual midpoint 162 and the output node NV, and a resistance element 161W coupled between the virtual midpoint 162 and the output node NW. The resistance elements 161U, 161V, 161W have the same resistance value.

The differential amplifier 140 amplifies the difference between a reference voltage Vref and the voltage Vd of the detection node 151. The voltage of either the midpoint 132 or the virtual midpoint 162 is used as the reference voltage Vref.

The amplifier 170 amplifies a voltage generated in the shunt resistor 123. This makes it possible to detect an interphase motor current between a U-phase, a V-phase, and a W-phase.

The MCU 110 is an integrated circuit that incorporates a computer including, for example, a CPU (central processing unit) and a memory. The MCU 110 implements various functions described in this specification by executing a program stored in the memory.

The MCU 110 further includes AD (analog-to-digital) converters 111, 112. The AD converter 111 converts the output of the differential amplifier 140 to a digital value. The AD converter 112 converts the output of the amplifier 170 to a digital value.

During a steady-state operation of the brushless DC motor 130, the MCU 110 generates PWM signals GUH, GUL, GVH, GVL, GWH, GWL in accordance, for example, with a motor current value detected by the shunt resistor 123, an estimated rotor position based on the output from the differential amplifier 140, and an operation command value 113. The MCU 110 outputs the generated PWM signals GUH, GUL, GVH, GVL, GWH, GWL respectively to the gates of the MOS transistors UH, UL, VH, VL, WH, WL included in the inverter circuit 120. Further, based on the generated PWM signals GUH, GUL, GVH, GVL, GWH, GWL, the MCU 110 generates the phase selection signals SLU, SLV, SLW, which switches the switch circuit 150.

Moreover, the MCU 110 performs an operation for starting up a stopped brushless DC motor 130. The start-up operation will be described in detail with reference to FIGS. 3 to 12.

Current Patterns of 120-degree Conduction Method

In the first embodiment, the MCU 110 controls the brushless DC motor 130 by a 120-degree conduction method. The 120-degree conduction method is such that a 120-degree portion of an electrical angle half cycle is a conduction period, and that the remaining 60-degree portion is a non-conduction period. Back electromotive force is generated during the non-conduction period. In the three-phase brushless DC motor, the conducting phase changes every 60-degree electrical angle. Therefore, six current patterns are generated.

The technology according to the present disclosure is applicable even in a case where the conduction period is a 120-degree or more and less than 180-degree portion of the electrical angle half cycle as far as the back electromotive force generated during the non-conduction period can be measured.

It is well to remember that the conduction period and non-conduction period of the above-mentioned 120-degree conduction method are different from the conduction period and regeneration period of PWM control. In a case where the conduction period and non-conduction period of the 120-degree conduction method need to be explicitly differentiated from the conduction period and regeneration period of PWM control, this specification designates the conduction period of the 120-degree conduction method as the ON period, and designates the non-conduction period of the 120-degree conduction method as the OFF period.

Figure 2:
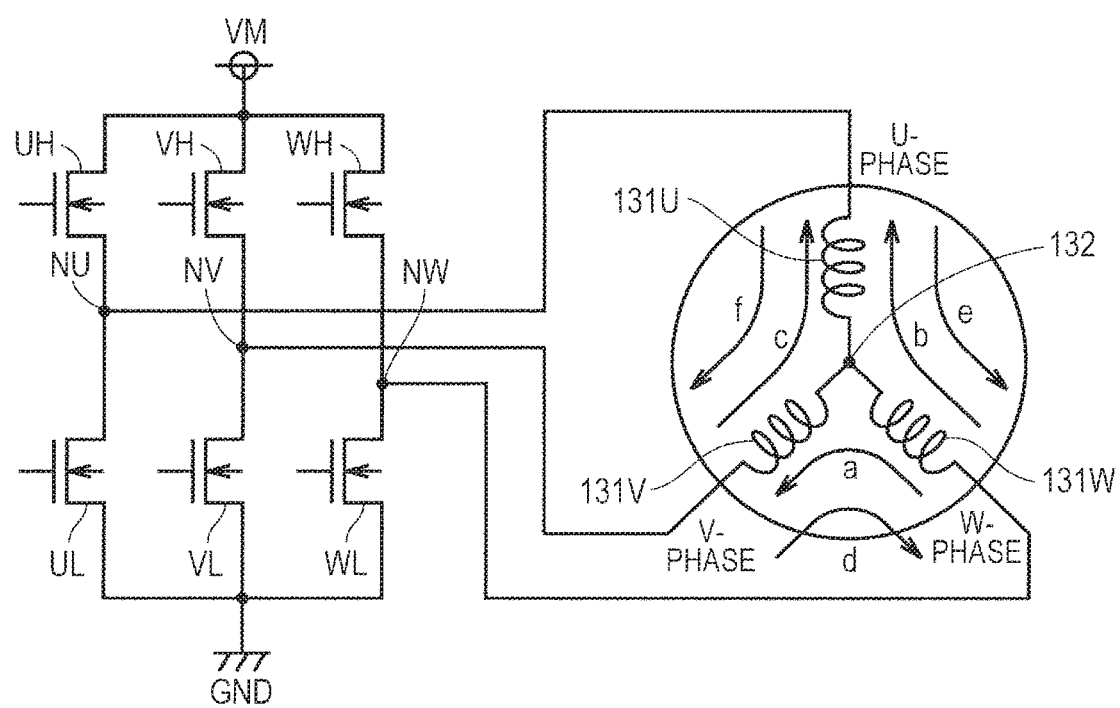
FIG. 2 is a diagram explaining about six current patterns in a 120-degree conduction method.

FIG. 2 is a diagram explaining about six current patterns in the 120-degree conduction method. FIG. 2 depicts six current patterns of currents a-f.

(a) Referring to FIG. 2, when control is exercised to place the W-phase upper arm MOS transistor WH and the V-phase lower arm MOS transistor VL in the ON state and place the others in the OFF state, a motor current a flows from the W-phase stator winding 131W to the V-phase stator winding 131V. The U-phase stator winding 131U is in a non-conducting state so that back electromotive force is generated. In the following description, this current pattern is referred to as the current pattern a.

Further, in the current pattern a, the U-phase is referred to as the "non-conducting phase", the W-phase is referred to as the "upstream conducting phase", and the V-phase is referred to as the "downstream conducting phase". The motor current flows in a direction from a stator winding in the upstream conducting phase to a stator winding in the downstream conducting phase. The other patterns are defined in a similar manner.

(b) When control is exercised to place the W-phase upper arm MOS transistor WH and the U-phase lower arm MOS transistor UL in the ON state and place the others in the OFF state, a motor current b flows from the W-phase stator winding 131W to the U-phase stator winding 131U. The V-phase stator winding 131V is in the non-conducting state so that back electromotive force is generated. In the following description, this current pattern is referred to as the current pattern b.

(c) When control is exercised to place the V-phase upper arm MOS transistor VH and the U-phase lower arm MOS transistor UL in the ON state and place the others in the OFF state, a motor current c flows from the V-phase stator winding 131V to the U-phase stator winding 131U. The W-phase stator winding 131W is in the non-conducting state so that back electromotive force is generated. In the following description, this current pattern is referred to as the current pattern c.

(d) When control is exercised to place the V-phase upper arm MOS transistor VH and the W-phase lower arm MOS transistor WL in the ON state and place the others in the OFF state, a motor current d flows from the V-phase stator winding 131V to the W-phase stator winding 131W. The U-phase stator winding 131U is in the non-conducting state so that back electromotive force is generated. In the following description, this current pattern is referred to as the current pattern d.

(e) When control is exercised to place the U-phase upper arm MOS transistor UH and the W-phase lower arm MOS transistor WL in the ON state and place the others in the OFF state, a motor current e flows from the U-phase stator winding 131U to the W-phase stator winding 131W. The V-phase stator winding 131V is in the non-conducting state so that back electromotive force is generated. In the following description, this current pattern is referred to as the current pattern e.

(f) When control is exercised to place the U-phase upper arm MOS transistor UH and the V-phase lower arm MOS transistor VL in the ON state and place the others in the OFF state, a motor current f flows from the U-phase stator winding 131U to the V-phase stator winding 131V. The W-phase stator winding 131W is in the non-conducting state so that back electromotive force is generated. In the following description, this current pattern is referred to as the current pattern f.

When the inverter circuit 120 is controlled in such a manner that a current flows to the brushless DC motor 130 in the above-mentioned current patterns a, b, c, d, e, f in the order named, the conducting phase sequentially changes, and the rotor of the brushless DC motor 130 rotates in synchronism with the resulting rotating electromagnetic field. For the sake of convenience, this specification designates this rotation direction as the forward direction.

Meanwhile, when the inverter circuit 120 is controlled in such a manner that a current flows to the brushless DC motor 130 in the reverse order from the above, that is, in the current patterns f, e, d, c, b, a in the order named, the conducting phase sequentially changes in the reverse order from the above-mentioned order of conducting phase changes. Therefore, the rotor of the brushless DC motor 130 rotates in synchronism with the resulting rotating electromagnetic field. For the sake of convenience, this specification designates this rotation direction as the reverse direction.

Overview of Control Exercised for Motor Start-up

Figure 3:
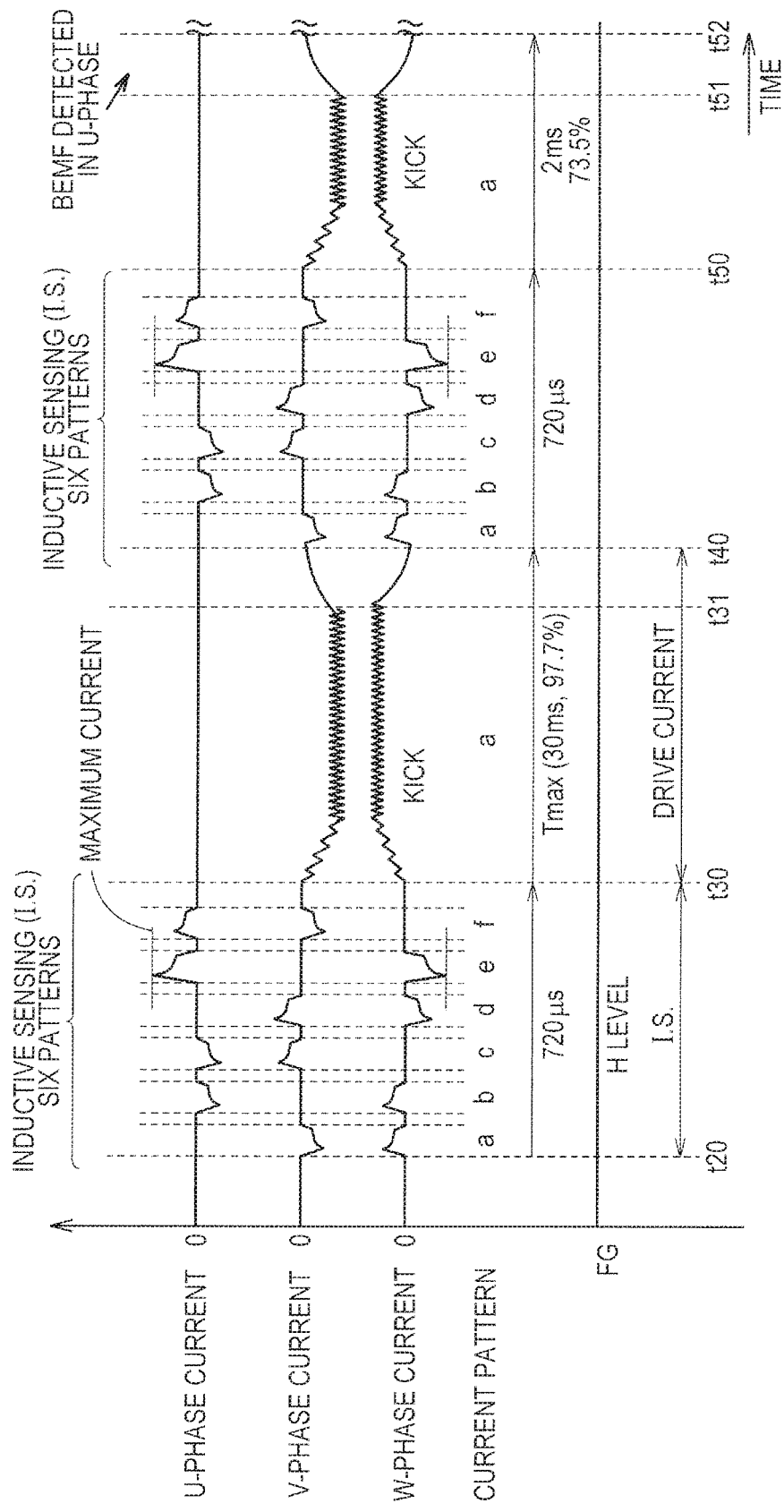
FIG. 3 is a diagram illustrating motor current waveforms for starting up a stopped motor.
Figure 4:
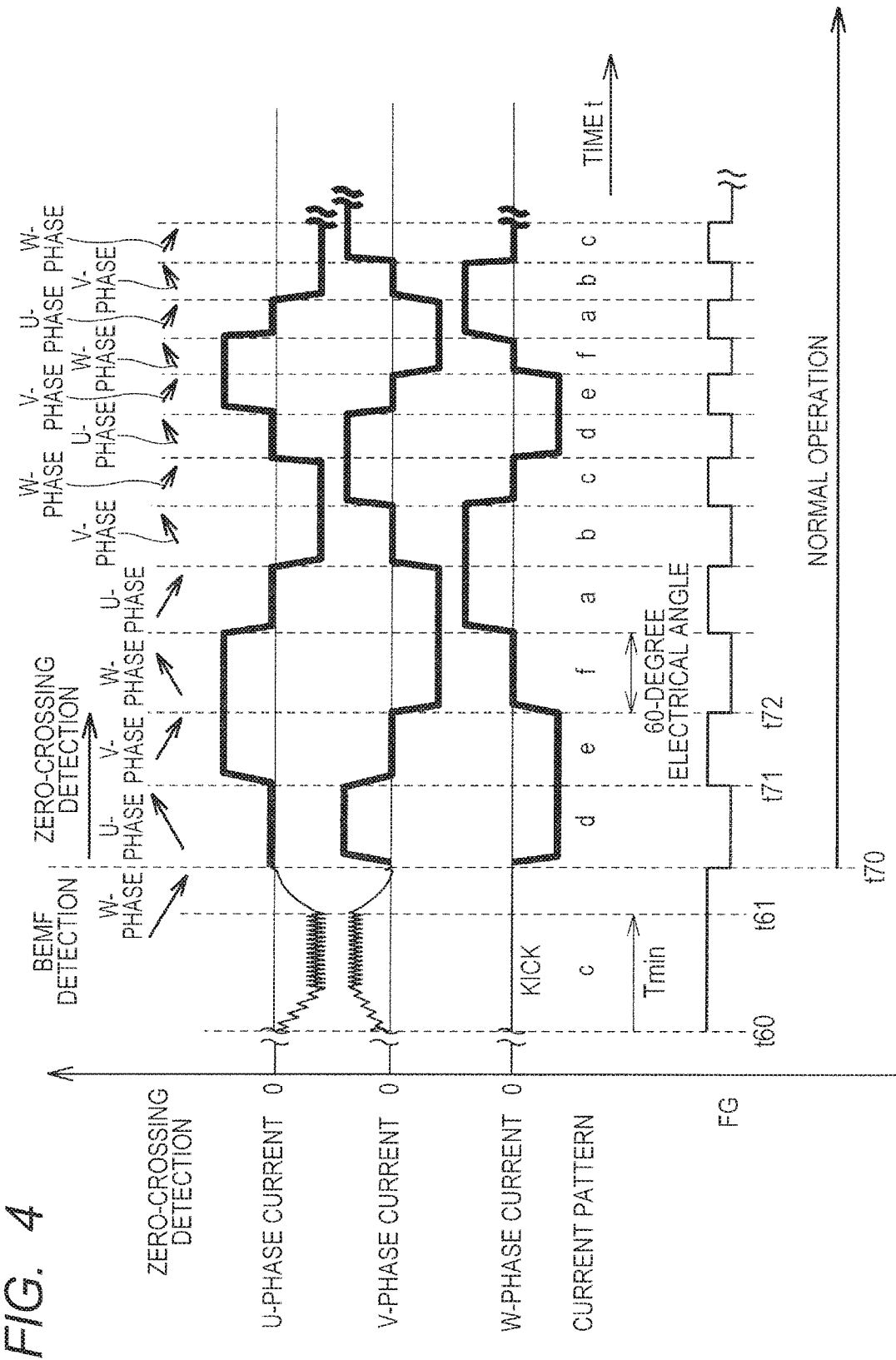
FIG. 4 is a diagram illustrating motor current waveforms for switching a motor from a start-up operation to a steady-state operation.

FIG. 3 is a diagram illustrating motor current waveforms for starting up a stopped motor. FIG. 4 is a diagram illustrating motor current waveforms for switching a motor from a start-up operation to a steady-state operation.

In FIGS. 3 and 4, the current patterns a-f described with reference to FIG. 2 are depicted in association with motor current waveforms. Further, FIGS. 3 and 4 depict the waveform of an FG (frequency generator) signal. The FG signal changes its logic level (between a high level and a low level) at a time point when the current pattern changes.

In FIGS. 3 and 4, the length of the horizontal axis is not proportional to actual time. Further, exemplary numerical values indicative of time intervals are merely illustrative for ease of understanding. The time intervals are not limited to such numerical values. Control exercised for starting up the brushless DC motor 130 is outlined below with reference to FIGS. 1, 3, and 4.

Before time t20 in FIG. 3, the motor is stopped. During the interval between time t20 and time t30, the MCU 110 detects the position of the rotor, for example, by the inductive sensing (I.S.) method.

More specifically, the MCU 110 controls the inverter circuit 120 in such a manner as to apply a drive voltage to the stator windings 131 in the order of six current patterns a-f described with reference to FIG. 2. In this instance, the voltage applied to the motor and the time of such voltage application are limited so as to prevent the rotor from rotating.

During a rotor position detection (inductive sensing) period, the MCU 110 uses the shunt resistor 123 to detect the magnitude of a motor current generated in an associated stator winding. The semiconductor device 100 is able to detect the position of the rotor in accordance with the result of motor current detection. More specifically, as described later with reference to FIG. 5A, the value of a detected motor current is maximized when the rotor-side pole of a stator winding 131 in the conducting phase and a rotor pole positioned to oppose the stator winding 131 attract each other. In the case of FIG. 3, the magnitudes (absolute values) of U-phase current and W-phase current are maximized in the current pattern e.

The time required for rotor position detection (inductive sensing) is approximately 720 µs in the example of FIG. 3, that is, considerably short. Therefore, even when the motor is rotating at a low speed, the above-described method is able to detect the position of the rotor.

An alternative method may be used to detect the position of the rotor. For example, the position of a stopped rotor may be detected by applying a drive voltage and then measuring a self-induced voltage.

During the subsequent interval between time t30 and time t40, the MCU 110 controls the inverter circuit 120 so as to apply a starting torque to the brushless DC motor 130 (the application of the starting torque is referred to as a "kick"). In this instance, based on the rotor position detected by inductive sensing, the MCU 110 determines a conducting phase (i.e., a current pattern) that applies maximum torque. In the examples of FIGS. 3 and 4, a drive current is supplied to a stator winding 131 in the conducting phase in the current pattern a indicative of the rotor position, which is advanced by a 120-degree electrical angle, rather than in the current pattern e (the torque applied in this case is approximately 0).

Here, during the application of the starting torque, the MCU 110 in the motor drive system 90 uses the detector 115 to detect the magnitude of back electromotive force generated in a non-conducting phase. More specifically, the MCU 110 applies a driving torque only for an initial application time T0 (e.g., the time when the rotor does not rotate at no load), then starts to compare the magnitude of back electromotive force with a threshold value, and when the threshold value is exceeded, stops the application of the driving torque. The initial application time T0 is provided because the back electromotive force is 0 while the rotor is stopped.

In the examples of FIGS. 3 and 4, the non-conducting phase is the U-phase. However, the MCU 110 is unable to detect a U-phase back electromotive force having a magnitude greater than the threshold value. That is to say, the brushless DC motor 130 is either stopped or hardly rotating. Therefore, at time t40, which is later than time t30, at which drive current application starts, by a predetermined maximum application time Tmax, the MCU 110 stops the supply of the drive current to the stator windings 131. The maximum application time Tmax is set, for example, to 30 ms. The value of the maximum application time Tmax is sufficiently longer than an inductive sensing execution time and corresponds to 97.7% of the whole period including an inductive sensing period.

During the subsequent interval between time t40 and time t50, the MCU 110 detects the position of the rotor again, that is, performs an inductive sensing operation again. During the subsequent interval between time t50 and time t52, the MCU 110 applies the starting torque to the brushless DC motor 130 in accordance with the result of the inductive sensing operation.

As the first kick hardly rotates the rotor, the drive current is applied to the stator windings 131 by using the same current pattern a as for the previous application of the starting torque.

During this application of the starting torque, the MCU 110 uses the detector 115 to detect back electromotive force generated in the U-phase, which is a non-conducting phase. As a result, at time t51, back electromotive force having a magnitude greater than the threshold value is detected in the U-phase, which is a non-conducting phase. Therefore, the MCU 110 stops the supply of the drive current. The interval between time t50 at which drive current application is started and the instant at which the drive current application is stopped is, for example, 2 ms. This interval corresponds to 73.5% of the whole period including the inductive sensing period.

The motor drive system 90 according to the present embodiment repeats the above inductive sensing and kick operations until the length of time between the instant at which drive current application is started and the instant at which the back electromotive force exceeds the threshold value (i.e., until the drive current application is stopped) is not longer than a minimum application time Tmin. Subsequently, based on zero-crossing detection of back electromotive force, the MCU 110 executes a sensorless drive of the brushless DC motor 130. (In this specification, the sensorless drive is referred to also as the normal operation or the steady-state operation.)

In the examples of FIGS. 3 and 4, the length of time of drive current application between time t60 and time t61 is not longer than the minimum application time Tmin. Thus, the MCU 110 subsequently starts to perform the normal operation at time t70. More specifically, as the current pattern during the last kick is current pattern c, the MCU 110 provides PWM (pulse width modulation) control of the inverter circuit 120 in such a manner that the drive current flows to the stator windings 131 of the brushless DC motor 130 in the current pattern d during the subsequent interval between time t70 and time t71. In this instance, the MCU 110 uses the detector 115 to detect a zero-crossing point of back electromotive force generated in the U-phase, which is a non-conducting phase. Subsequently, the drive current is applied in the current patterns e, f, g, a, b, c, . . . in the order named.

Relationship Between Rotor Position Detection and Current Drive Phase

Sensorless control exercised as described above when the brushless DC motor 130 starts up will now be described in further detail. First of all, the relationship between rotor position detection and current drive phase during motor start-up will be described.

Figure 5A:
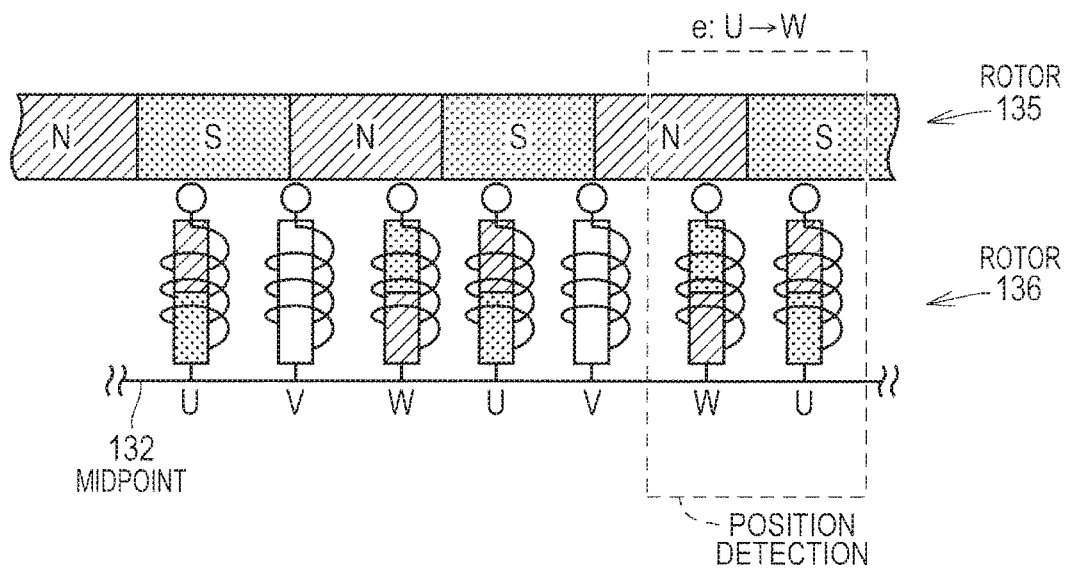
FIGS. 5A and 5B are diagrams illustrating the relationship between rotor position detection and current drive phase during motor start-up.
Figure 5B:
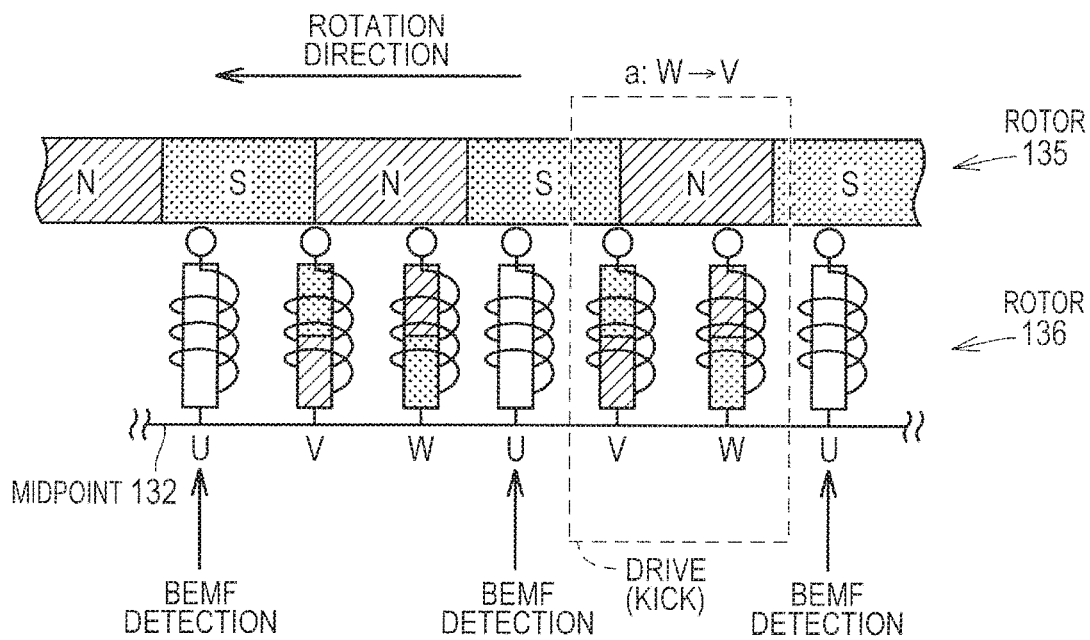

FIGS. 5A and 5B are diagrams illustrating the relationship between rotor position detection and current drive phase during motor start-up. Referring to FIG. 5, the pole N of a rotor 135 is indicated by oblique line hatching, and the pole S is indicated by dot hatching. The N pole generated in the winding core of a stator 136 is indicated by oblique line hatching, and the S pole is indicated by dot hatching. The core of a stator winding not hatched is in a non-conducting phase.

FIG. 5A illustrates the arrangement of the rotor 135 in a case where inductive sensing provides a maximum motor current. More specifically, in the current pattern e, that is, when a current flows from the U-phase stator winding 131U to W-phase stator winding 131W, a motor current having a maximum magnitude is detected. In this case, the rotor-side pole of the U-phase stator winding is an N pole, and attracts the pole S of the rotor 135 that is positioned to oppose the U-phase stator winding. The rotor-side pole of the W-phase stator winding is an S pole, and attracts the pole N of the rotor 135 that is positioned to oppose the W-phase stator winding. In this case, the torque applied to the rotor 135 is 0.

FIG. 5B illustrates poles that are generated in the stator windings 131 when a drive current is applied in accordance with the result of inductive sensing indicated in FIG. 5A. The drive current is applied in the current pattern a, which is advanced by a 120-degree electrical angle from the current pattern e in FIG. 5A. That is to say, the drive current flows from the W-phase stator winding to the V-phase stator winding. As a result, a torque oriented in the direction of rotation indicated in FIG. 5B is applied to the rotor 135. When the 120-degree conduction method is employed, a 60-degree electrical angle is a minimum unit; therefore, an electrical angle setting is acceptable only when it is an integer multiple of 60 degrees.

Positional Relationship Between Stator Winding Pole and Rotor Pole

FIGS. 6A, 6B, 7A, and 7B are schematic diagrams illustrating the positional relationship between the poles of stator windings and the poles of a rotor. For the sake of simplicity, FIGS. 6A, 6B, 7A, and 7B assume that the rotor 135 has two poles. Therefore, the electrical angle is equal to the mechanical angle. A current pattern in which the maximum motor current is obtained by inductive sensing is used as the reference electrical angle (0 degrees).

Figure 6A:
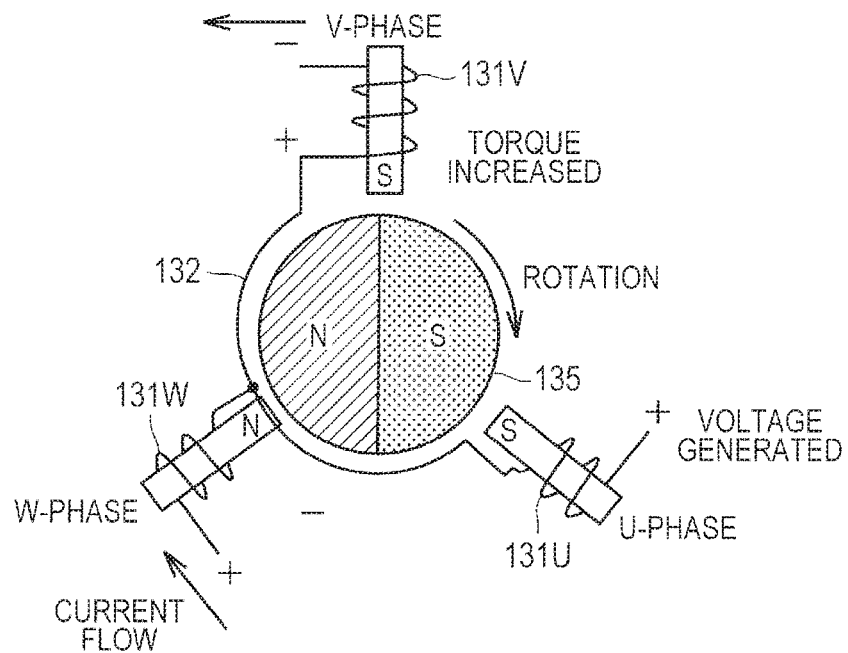
FIGS. 6A and 6B are schematic diagrams illustrating the positional relationship between the poles of stator windings and the poles of a rotor (in a case where the advanced electrical angle is 120 degrees or 90 degrees)
Figure 6B:
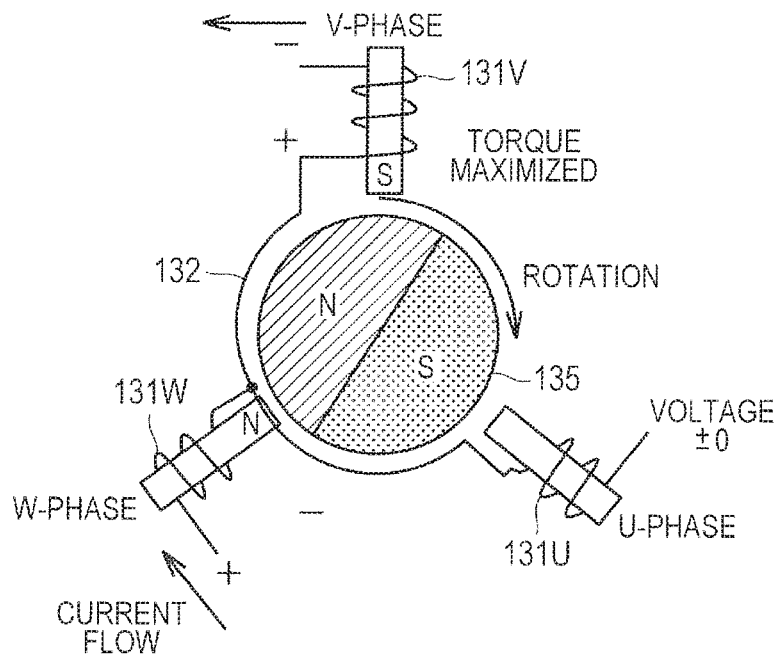
Figure 7A:
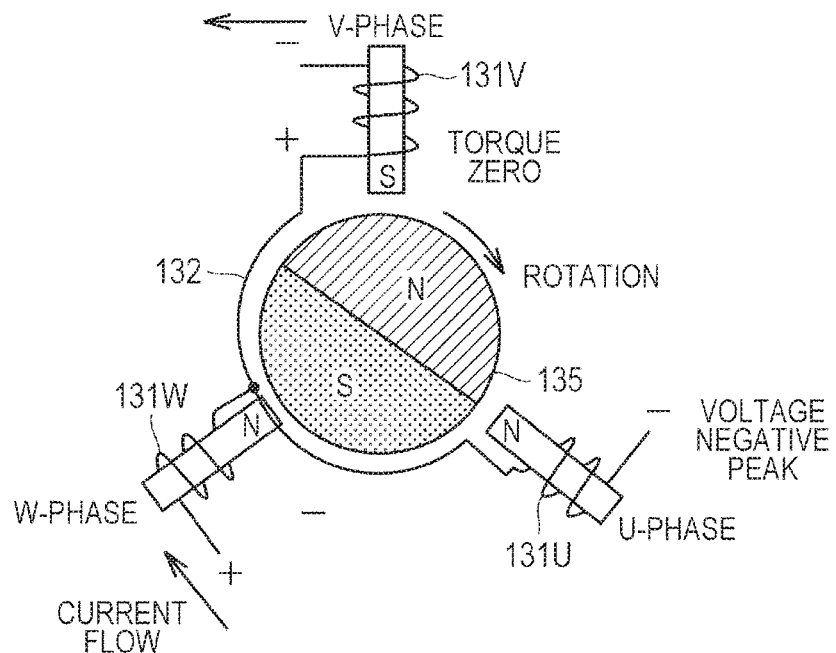
FIGS. 7A and 7B are schematic diagrams illustrating the positional relationship between the poles of stator windings and the poles of a rotor (in a case where the electrical angle is 0 degrees or −30 degrees)
Figure 7B:
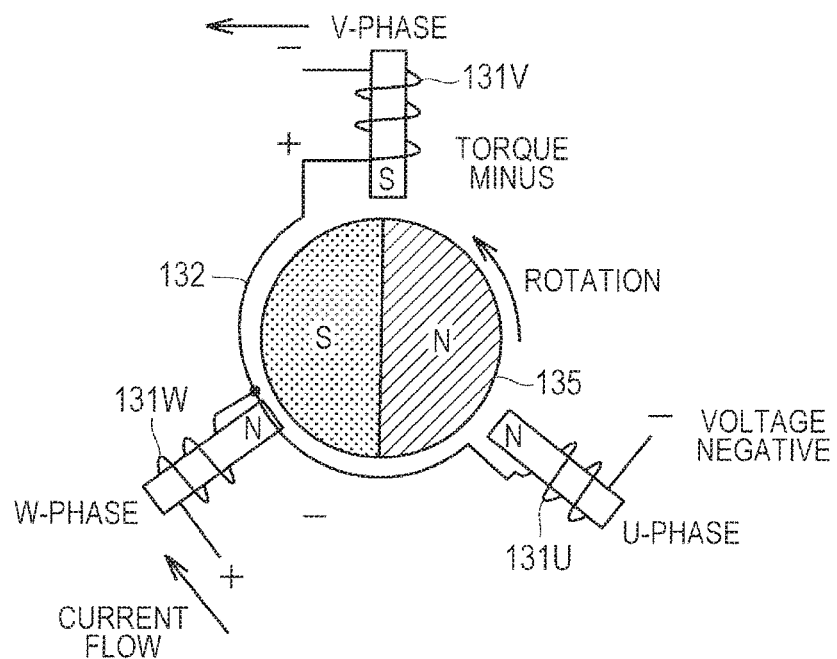

More specifically, FIG. 6A illustrates the positional relationship between the poles of stator windings and the poles of a rotor in a case where the advanced electrical angle is 120 degrees, and FIG. 6B illustrates the positional relationship in a case where the advanced electrical angle is 90 degrees. FIG. 6A depicts a state where a kick starts, and FIG. 6B depicts a state where the rotor has rotated through a 30-degree electrical angle since the start of the kick. FIG. 7A illustrates the positional relationship between the poles of the stator windings and the poles of the rotor in a case where the electrical angle is 0 degrees, and FIG. 7B illustrates the positional relationship in a case where the electrical angle is −30 degrees. FIG. 7A depicts a state where the rotor has rotated through a 120-degree electrical angle since the start of the kick, and FIG. 7B depicts a state where the rotor has rotated through a 150-degree electrical angle since the start of the kick.

The position of the midpoint 132 of the stator windings 131 with respect to the rotor 135 in FIGS. 6A, 6B, 7A, and 7B is opposite to the position in FIGS. 5A and 5B, and the direction in which the stator windings 131 are wound is also opposite from each other. However, the rotor-side poles (N poles or S poles) generated by the motor current are the same. When, for example, the motor current flows from the W-phase stator winding 131W to the V-phase stator winding 131V, the rotor-side pole of the W-phase stator winding 131W is an N pole, and the rotor-side pole of the U-phase stator winding 131U is an S pole.

Referring to FIG. 6A, it is assumed in inductive sensing that the magnitude of the motor current is maximized when the current pattern e is used (i.e., when the motor current flows from the U-phase stator winding 131U to the W-phase stator winding 131W). In this state, the torque applied to the rotor 135 is 0.

In order to apply the starting torque to the rotor 135 after the end of inductive sensing, a drive current in the current pattern a is given to the stator windings 131 so that the resulting conducting state is advanced by a 120-degree electrical angle from the current pattern e. That is to say, the motor current flows from the W-phase stator winding 131W to the V-phase stator winding 131V. As a result, a torque oriented in the direction of rotation indicated in FIG. 6A is applied to the rotor 135. Further, a positive back electromotive force is generated in the U-phase, which is a non-conducting phase.

Referring to FIG. 6B, it is assumed that a time corresponding to a 30-degree electrical angle elapses in the state depicted in FIG. 6A (i.e., the advanced electrical angle is 90 degrees). As the electrical angle is equal to the mechanical angle in the examples of FIGS. 6A, 6B, 7A, and 7B, the rotor 135 rotates through a mechanical angle of 30 degrees in the state depicted in FIG. 6A. In this instance, the torque applied to the rotor 135 is maximized. Meanwhile, a back electromotive force of approximately 0 is generated in the U-phase, which is a non-conducting phase.

Referring to FIG. 7A, it is assumed that a time corresponding to a 90-degree electrical angle has further elapsed in the state depicted in FIG. 6B (i.e., the electrical angle is 0 degrees). The rotor 135 further rotates through a mechanical angle of 90 degrees in the state depicted in FIG. 6B. In this instance, the torque applied to the rotor 135 is 0, and the back electromotive force in the U-phase, which is a non-conducting phase, has a negative peak value.

Referring to FIG. 7B, it is assumed that a time corresponding to a 30-degree electrical angle has further elapsed in the state depicted in FIG. 7A (i.e., the electrical angle is −30 degrees). The rotor 135 further rotates through a mechanical angle of 30 degrees in the state depicted in FIG. 7A.

Relationship Between Back Electromotive Force and Torque Given to Rotor

Figure 8:
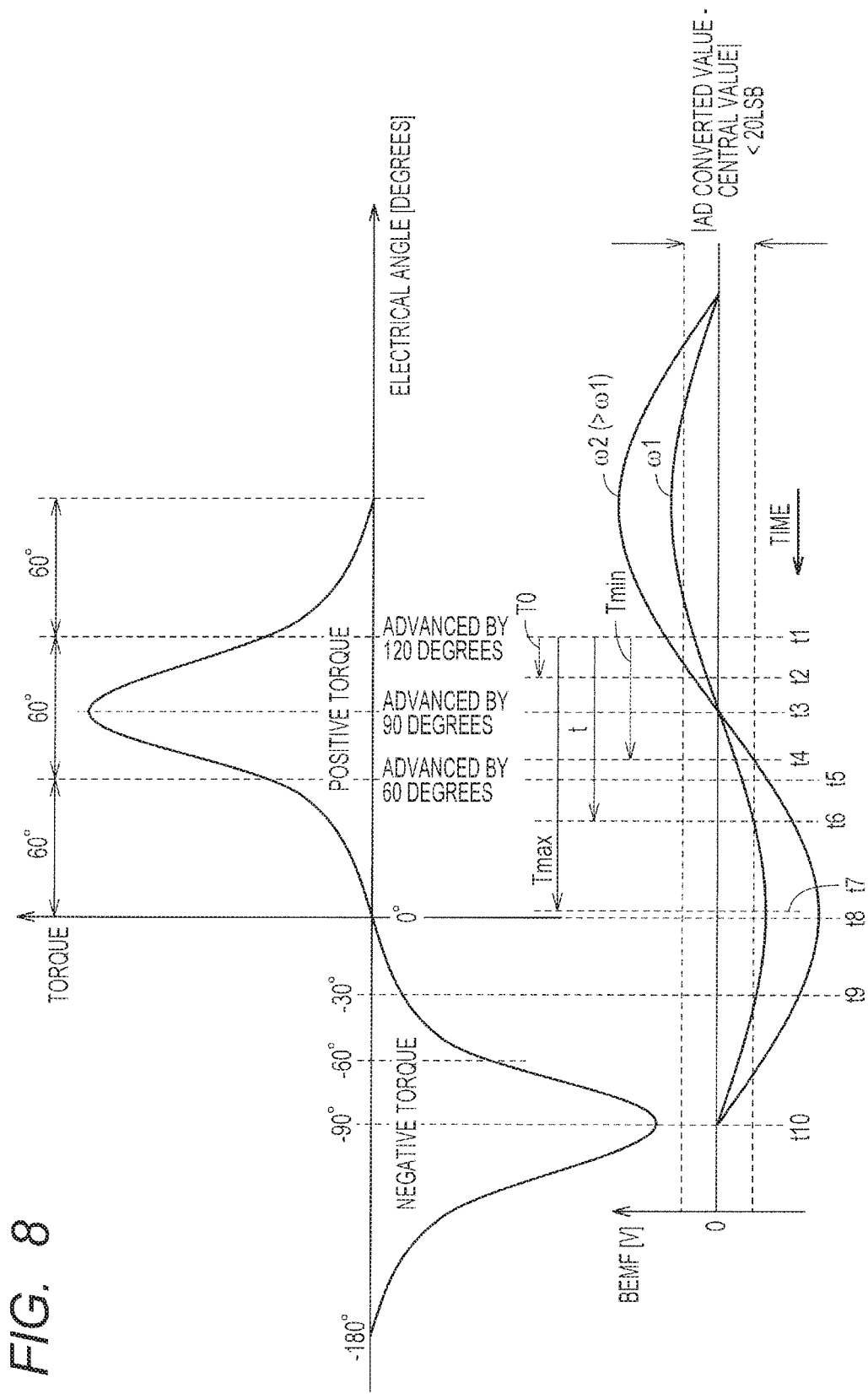
FIG. 8 is a diagram illustrating the relationship between torque given to a rotor and back electromotive force generated in a non-conducting phase.

FIG. 8 is a diagram illustrating the relationship between torque given to the rotor and back electromotive force generated in a non-conducting phase. FIG. 8 assumes that a current pattern in which the maximum motor current is obtained by inductive sensing is used as the reference electrical angle (0 degrees). If the number of rotor poles is 2×p, an electrical angle of θ corresponds to a mechanical angle of θ/p. Therefore, when the electrical angle changes by θ, the rotor rotates through θ/p.

Further, the magnitude of back electromotive force generated in a non-conducting phase increases with an increase in the rotation speed of the rotor. FIG. 8 depicts cases where the rotation speed is ω1 [revolutions per minute (rpm)] or ω2. It is assumed that ω2>ω1.

Referring to FIGS. 1 and 8, the MCU 110 controls the inverter circuit 120 in such a manner as to start applying a drive current to the stator windings in a current pattern that is advanced by a 120-degree electrical angle. It is assumed that this kick starts at time t1. At time t1, a positive torque for rotating the rotor in the forward direction is given, and the torque increases as time advances. In this instance, the back electromotive force generated in a stator winding 131 in a non-conductive phase has a positive value with reference to the potential (0 V) of the midpoint 132. Time t1 corresponds to FIG. 6A.

At time t3 at which a time corresponding to a 30-degree electrical angle elapses from time t1, the torque applied to the rotor has a positive maximum value, and the back electromotive force generated in a non-conducting phase is 0. Time t4 corresponds to FIG. 6B. Further, at time t5 at which a time corresponding to a 30-degree electrical angle elapses from time t4, the back electromotive force generated in a non-conducting phase is negative.

At time t8 at which the electrical angle corresponds to a reference value of 0 degrees, the applied torque is 0. In this instance, the back electromotive force generated in a non-conducting phase has a negative peak value. Time t8 corresponds to FIG. 7A. Further, at time t9 (electrical angle: −30 degrees) at which a time corresponding to a 30-degree electrical angle elapses from time t8, the torque applied to the rotor is negative. That is to say, the torque for rotating the rotor in the reverse direction is applied. Time t9 corresponds to FIG. 7B.

At time t10 (electrical angle: −90 degrees) at which a time corresponding to a 90-degree electrical angle elapses from time t8, the torque applied to the rotor has a negative peak value. In this instance, the back electromotive force generated in a non-conducting phase is 0.

The MCU 110 in the motor drive system 90 according to the present embodiment stops applying the starting torque to the rotor when the magnitude of the back electromotive force generated in a non-conducting phase is not smaller than the threshold value. The magnitude of the back electromotive force is proportional to the absolute value of a value that is obtained by subtracting a central value from an analog-to-digital converted value of the output voltage Vout of the detector 115 depicted in FIG. 1. The central value corresponds to the analog-to-digital converted value of a voltage at the midpoint 132 or the virtual midpoint 162. In the example of FIG. 8, 20 LSB (least-significant bit) is selected as the threshold value. This value is determined in consideration of noise included in the output voltage Vout of the detector 115. The above exemplary value is merely illustrative and not restrictive. The threshold value is not limited to the above exemplary value.

Referring to FIG. 8, when the rotation speed of the rotor is ω1, the detected magnitude of the back electromotive force reaches the threshold value at time t6. Therefore, the drive current is applied to the stator windings 131 during a period of time t between time t1 and time t6. Time t is shorter than the maximum application time Tmax and longer than the initial application time T0 and the minimum application time Tmin. It should be noted, however, that T0<Tmin<Tmax.

There may be a case where the maximum application time Tmax is referred to as the first reference time, the minimum application time Tmin is referred to as the second reference time, and the initial application time T0 is referred to as the third reference time.

Referring to FIG. 8, when the rotation speed of the rotor is ω2 (>ω1), the initial application time T0 elapses at time t2. At time t4, the back electromotive force exceeds the threshold value. The interval between time t1, at which the application of starting toque starts, and time t4 is not longer than the minimum application time Tmin. Therefore, the application of drive current stops at this time point, and then the operation mode of the brushless DC motor changes to a normal operation mode in accordance with zero-crossing detection of back electromotive force.

Operation Control Procedure for Brushless DC Motor

Figure 9:
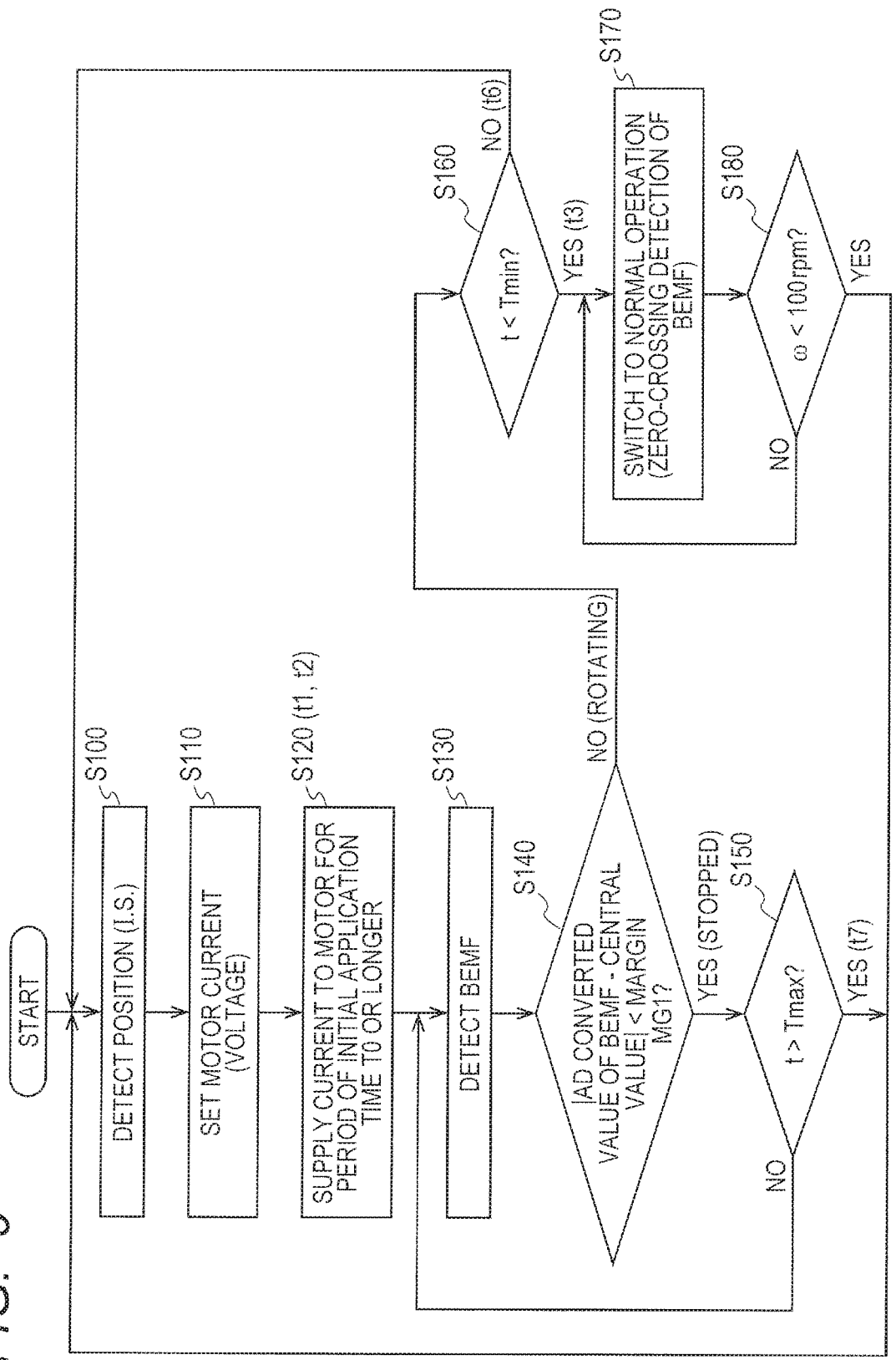
FIG. 9 is a flowchart illustrating an exemplary operation control procedure for a brushless DC motor in a first embodiment of the present disclosure.

FIG. 9 is a flowchart illustrating an exemplary operation control procedure for the brushless DC motor in the first embodiment. The foregoing description will now be summarized with reference to FIGS. 1 and 9. It is assumed that the brushless DC motor 130 is initially stopped.

In step S100, in order to detect the position of the rotor, the MCU 110 performs inductive sensing by controlling the inverter circuit 120. More specifically, the MCU 110 supplies a current to the stator windings 131 in each of the current patterns a-f depicted in FIG. 2. In this instance, the current value is limited so as to prevent the rotor from rotating. Based, for example, on a current pattern in which the maximum motor current is obtained, the MCU 110 estimates the positions of the stator windings.

Next, in step S110, based on the result of inductive sensing, the MCU 110 determines a current pattern that is advanced by a 120-degree electrical angle from the current rotor position, and determines the output voltage (current) of the inverter circuit 120 in the determined current pattern.

Next, in step S120, the MCU 110 starts to apply the drive current to the stator windings 131. When the initial application time T0 elapses since the start of current application, the MCU 110 uses the detector 115 to start detecting the back electromotive force (BEMF) (step S140). The start of drive current application corresponds to time t1 in FIG. 8, and a time point at which the initial application time T0 elapses corresponds to time t2 in FIG. 8.

Next, in step S140, the MCU 110 compares the absolute value of a value obtained by subtracting the central value from the analog-to-digital converted value of the output voltage Vout of the detector 115 (i.e., the magnitude of the back electromotive force) with the threshold value (i.e., a margin MG1). The central value corresponds to the analog-to-digital converted value of a voltage at the midpoint 132 or the virtual midpoint 162. A case where the magnitude of the back electromotive force is smaller than the margin MG1 (YES at step S140) indicates that the rotor is stopped. Meanwhile, a case where the magnitude of the back electromotive force is not smaller than the margin MG1 (NO at step S140) indicates that the rotor is rotating.

If the result of the above comparison indicates that the magnitude of the back electromotive force is smaller than the margin MG1 (YES at step S140), and that the length of time t from the start of drive current application is not longer than the maximum application time Tmax (NO at step S150), the MCU 110 repeats the detection of back electromotive force (step S130) and the comparison of detected magnitude of back electromotive force with the margin MG1 (step S140).

If the magnitude of the back electromotive force is smaller than the margin MG1 (YES at step S140) and the length of time t from the start of drive current application is longer than the maximum application time Tmax (YES at step S150), the MCU 110 stops applying the drive current and repeats the initial step of detecting the rotor position (step S100) and each of the above-described subsequent steps. A time point at which the maximum application time Tmax is exceeded corresponds to time t7 in FIG. 8.

Meanwhile, if the result of the above comparison indicates that the detected magnitude of the back electromotive force is not smaller than the margin MG1 (NO at step S140), and that the length of time t from the start of drive current application is not shorter than the minimum application time Tmin (NO at step S160), the MCU 110 stops applying the drive current and repeats the initial step of detecting the rotor position (step S100) and each of the above-described subsequent steps. This case corresponds, for example, to time t6 in FIG. 8.

If the detected magnitude of the back electromotive force is not smaller than the margin MG1 (NO at step S140) and the length of time t from the start of drive current application is shorter than the minimum application time Tmin (YES at step S160), the MCU 110 completes the start-up operation of the brushless DC motor 130, and then switches to the normal operation based on zero-crossing detection of back electromotive force (step S170).

If the rotation speed of the rotor is not lower than a predetermined value (e.g., 100 rpm) (NO at step S180), the MCU 110 continues with the normal operation. If, by contrast, the rotation speed of the rotor is lower than the predetermined value (YES at step S180), the MCU 110 concludes that the rotor is almost stopped due to an increased load, and performs the start-up operation starting with the initial step of detecting the rotor position (step S100).

Advantages of First Embodiment

Advantages of the first embodiment will now be described in comparison with a comparative example.

FIGS. 10A and 10B are diagrams illustrating temporal changes in motor torque during the start-up operation of the brushless DC motor in the motor drive system according to the first embodiment. FIG. 10A illustrates a case where load torque is relatively high, and FIG. 10B illustrates a case where the load torque is relatively low. Further, an average torque AVTRQ generated by the brushless DC motor is indicated by a broken line, and a minimum torque MinTRQ required for motor rotation is indicated by a one-dot chain line.

Referring to FIG. 10A, inductive sensing (I.S.) is performed on a stopped brushless DC motor during the interval between time t100 and time t101. For ease of illustration, the indicated time for inductive sensing is longer than the actual time. Subsequently, a kick is performed starting at time t101. As the maximum application time Tmax elapses at time t102 before the rotor substantially rotates (that is, before the magnitude of the back electromotive force reaches the threshold value), the kick ends.

Inductive sensing is performed again during the interval between time t102 and time t103, and a kick starts at time t103. The kick ends at time t104 because the back electromotive force reaches the threshold value. As the duration of the kick (the interval between time t103 and time t104) is longer than the minimum application time Tmin, inductive sensing is performed again starting at time t104, and ended at time t105. A kick starts at time t105.

At time t106, the kick ends because the back electromotive force reaches the threshold value. As the duration of the kick (the interval between time t105 and time t106) is longer than the minimum application time Tmin, inductive sensing is performed again starting at time t106, and ended at time t107. A kick starts at time t107. The kick ends at time t108 because the back electromotive force reaches the threshold value. As the duration of the kick (the interval between time t107 and time t108) is shorter than the minimum application time Tmin, the start-up operation of the brushless DC motor ends, and the operation mode immediately changes to the normal operation mode. As described above, in the present embodiment, the duration of the kick gradually decreases with an increase in the rotation speed of the rotor.

A case where the load torque is considerably low will now be described. Referring to FIG. 10B, inductive sensing (I.S.) is performed on a stopped brushless DC motor during the interval between time t110 and time t11, and a kick is performed starting at time t11. At time t112, the kick ends because the back electromotive force reaches the threshold value. As the duration of the kick (the interval between time t11 and time t112) is shorter than the minimum application time Tmin, the start-up operation of the brushless DC motor ends, and the operation mode immediately changes to the normal operation mode.

As described above, the motor drive system according to the present embodiment determines the period of time between the start and end of a kick during the start-up operation in accordance with the magnitude of the back electromotive force. As the back electromotive force increases with an increase in the rotation speed of the rotor, the duration of the kick shortens with an increase in the number of kicks. Further, the number of repetition times of the combination of inducting sensing and kick is also determined in accordance with the magnitude of the back electromotive force. More specifically, when the interval between the instant at which a kick starts and the instant at which the magnitude of the back electromotive force reaches the threshold value is shorter than the minimum application time Tmin, the start-up operation ends, and the operation mode changes to the normal operation mode. Therefore, in a case where the load torque is low, the operation mode may change to the normal operation mode as indicated in FIG. 10B when an inductive sensing operation and a kick are each performed once.

Figure 11A:
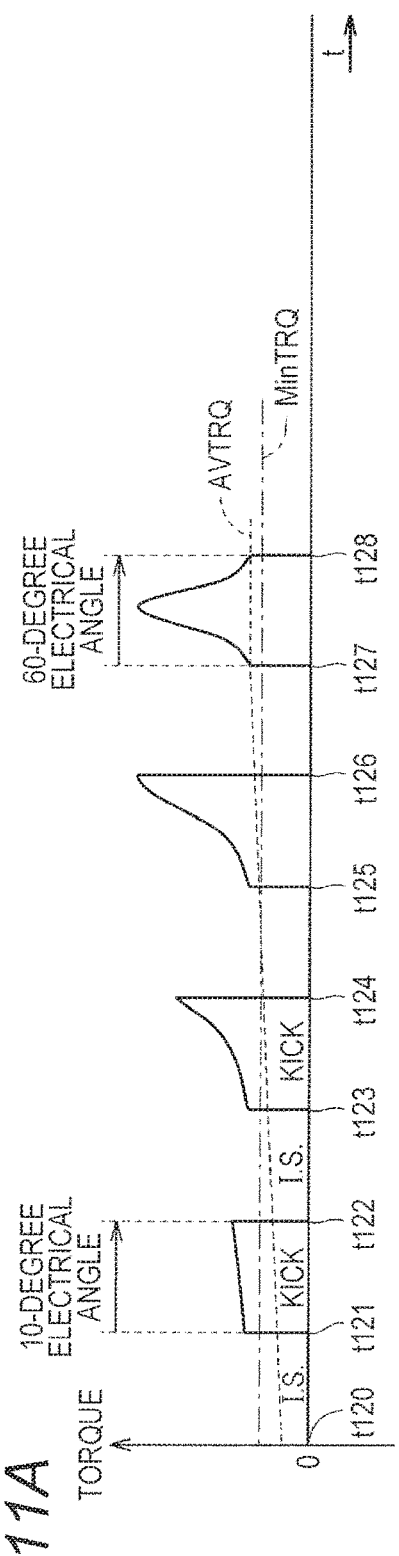
FIGS. 11A and 11B are diagrams illustrating temporal changes in motor torque during a start-up operation of a brushless DC motor in a motor drive system according to a comparative example.
Figure 11B:
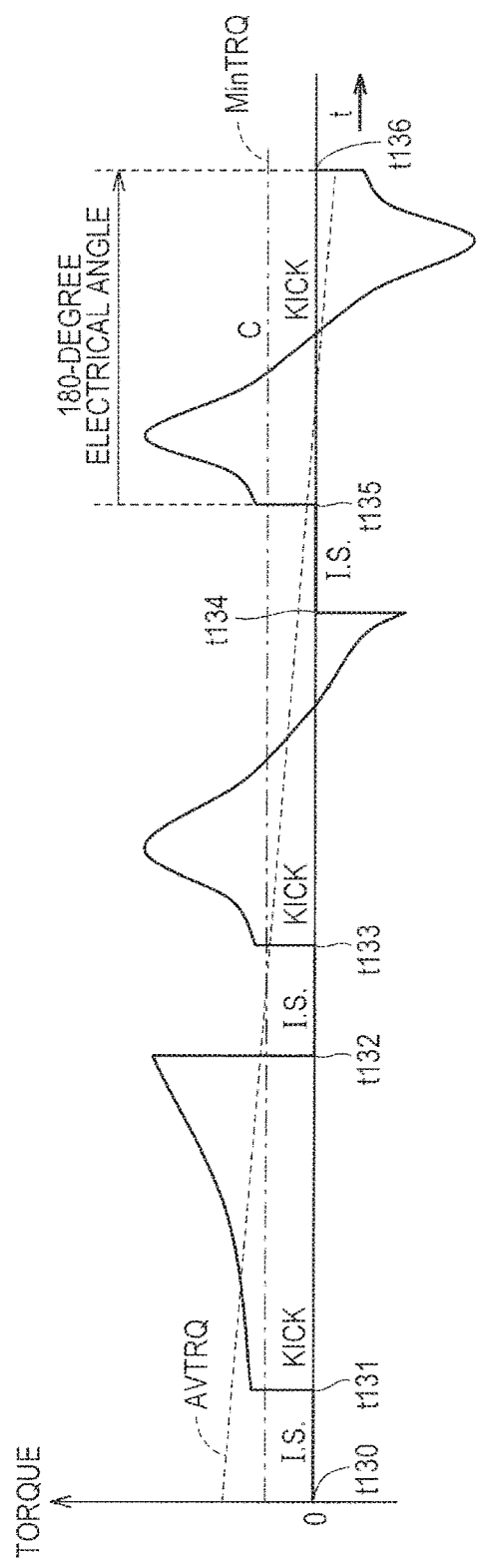

FIGS. 11A and 11B are diagrams illustrating temporal changes in motor torque during a start-up operation of a brushless DC motor in a motor drive system according to the comparative example. FIGS. 11A and 11B illustrate a case where the time and the number of kicks are fixed. FIG. 11A depicts a case where the load torque is relatively high, and FIG. 11B depicts a case where the load torque is relatively low. Further, the average torque AVTRQ generated by the brushless DC motor is indicated by a broken line, and the minimum torque MinTRQ required for motor rotation is indicated by a one-dot chain line.

Referring to FIG. 11A, the combination of inducting sensing and kick is repeated four times. The interval between the start and end of each kick (the interval between time t121 and time t122, between time t123 and time t124, between time t125 and time t126, or between time t127 and time t128) is fixed. Therefore, the first kick, which is performed between time t121 and time t122, ends when the rotation corresponds to an electrical angle of 10 degrees only, that is, before sufficient starting torque is not applied to the motor. Meanwhile, the fourth kick, which is performed between time t127 and time t128, is continuously performed although the rotation speed is sufficiently high and above the maximum torque. Consequently, as compared to the present embodiment depicted in FIG. 10A, an excessive starting current is applied so that an extra amount of time is required for start-up.

A case where the load torque is considerably low will now be described. Referring to FIG. 11B, the combination of inducting sensing and kick is repeated three times. The interval between the start and end of each kick (the interval between time t131 and time t132, between time t133 and time t134, or between time t135 and time t136) is fixed. Therefore, a kick is repeatedly performed even if a negative motor torque is applied from the stator windings to the rotor as indicated by the second and third kicks. As a result, the rotation speed of the rotor is decreased so that sufficient starting torque is not applied to the rotor.

Meanwhile, the motor drive system according to the present embodiment determines the period of time between the start and end of a kick in accordance with the magnitude of the back electromotive force. Therefore, even if the load torque is considerably low, the kick can be ended before the motor torque turns negative. Consequently, the brushless DC motor can be efficiently started up.

Figure 12:
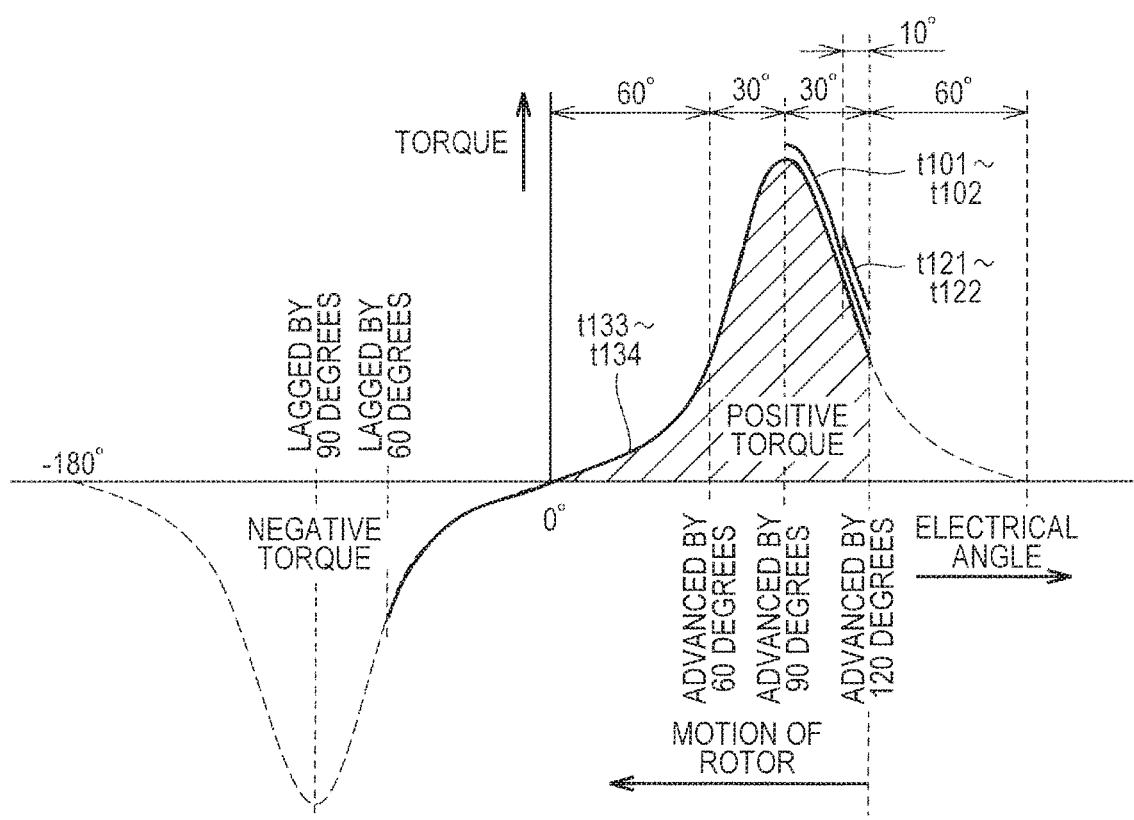
FIG. 12 is a diagram illustrating the relationship between load torque and electrical angle during a start-up operation in the cases depicted in FIGS. 10A, 10B, 11A, and 11B.

FIG. 12 is a diagram illustrating the relationship between load torque and electrical angle during a start-up operation in the cases depicted in FIGS. 10A, 10B, 11A, and 11B. Referring to FIG. 12, the drive current is applied in such a manner that the electrical angle is advanced by 120 degrees from the case where the load torque is 0. The electrical angle changes with the rotation of the rotor.

The interval between time t101 and time t102 in FIGS. 10A and 10B corresponds to the interval from an advanced electrical angle of 120 degrees to an advanced electrical angle of 90 degrees. The interval between time t121 and time t122 in FIGS. 11A and 11B corresponds to an electrical angle of 10 degrees, and indicates that sufficient motor torque is not applied to the rotor. Further, the interval between time t133 and time t134 in FIGS. 11A and 11B corresponds to a 180-degree interval from an advanced electrical angle of 120 degrees to an electrical angle of −60 degrees so that the time of current application is extended to a negative torque region.

As described above, the motor drive system according to the first embodiment is able to generate a high torque with a small amount of current even in a case where the load torque varies each time a stopped brushless DC motor is started up or varies during start-up. Further, the motor drive system according to the first embodiment is also able to reduce the time required to switch from a start-up operation to a normal operation.

Second Embodiment

The motor drive system according to the first embodiment determines the end of a kick in accordance with the magnitude of back electromotive force. Meanwhile, the motor drive system according to a second embodiment focuses additional attention on the sign of back electromotive force in order to determine whether or not the rotor is rotating in the reverse direction. A detailed description will now be given with reference to the accompanying drawings. The overall configuration of the motor drive system will not be redundantly described because it is the same as described in conjunction with the first embodiment, which is described with reference to FIG. 1.

Operation Control Procedure for Brushless DC Motor

Figure 13:
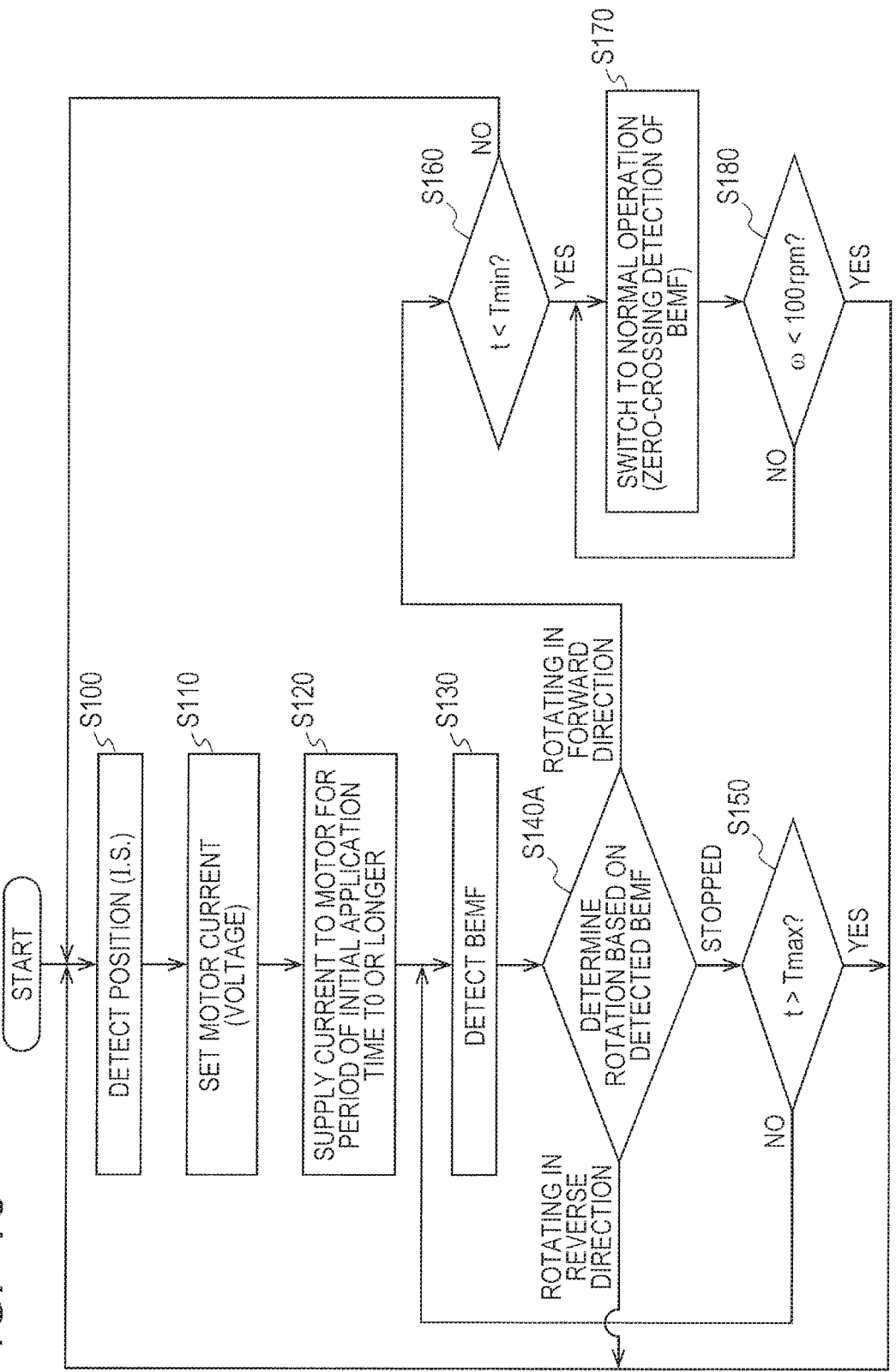
FIG. 13 is a flowchart illustrating an exemplary operation control procedure for a brushless DC motor in a second embodiment of the present disclosure.

FIG. 13 is a flowchart illustrating an exemplary operation control procedure for the brushless DC motor in the second embodiment. The operation control procedure illustrated in FIG. 13 differs from the operation control procedure illustrated in FIG. 9 in that step S140A is used instead of step S140. In step S140A, the MCU 110 determines, in accordance with a detected value of back electromotive force (i.e., the magnitude and sign of back electromotive force), whether the rotor is rotating in the forward direction, rotating in the reverse direction, or almost stopped.

If it is determined in step S140A that the rotor is rotating in the forward direction, the MCU 110 proceeds to step S160 and determines whether the time of drive current application is shorter than the minimum application time Tmin. If it is determined in step S140A that the rotor is stopped, the MCU 110 proceeds to step S150 and determines whether the time of drive current application is longer than the maximum application time Tmax. If it is determined in step S140A that the rotor is rotating in the reverse direction, the MCU 110 proceeds to step S100 and performs inductive sensing again. In the other respects, FIG. 13 is the same as FIG. 9. Therefore, steps identical or equivalent to those in FIG. 9 are designated by the same reference numerals as their counterparts and will not be redundantly described.

Determining Whether Rotation Direction is Forward or Reverse

A procedure for determining whether the rotation direction is forward or reverse will now be described with reference to FIGS. 14 and 15.

Figure 14:
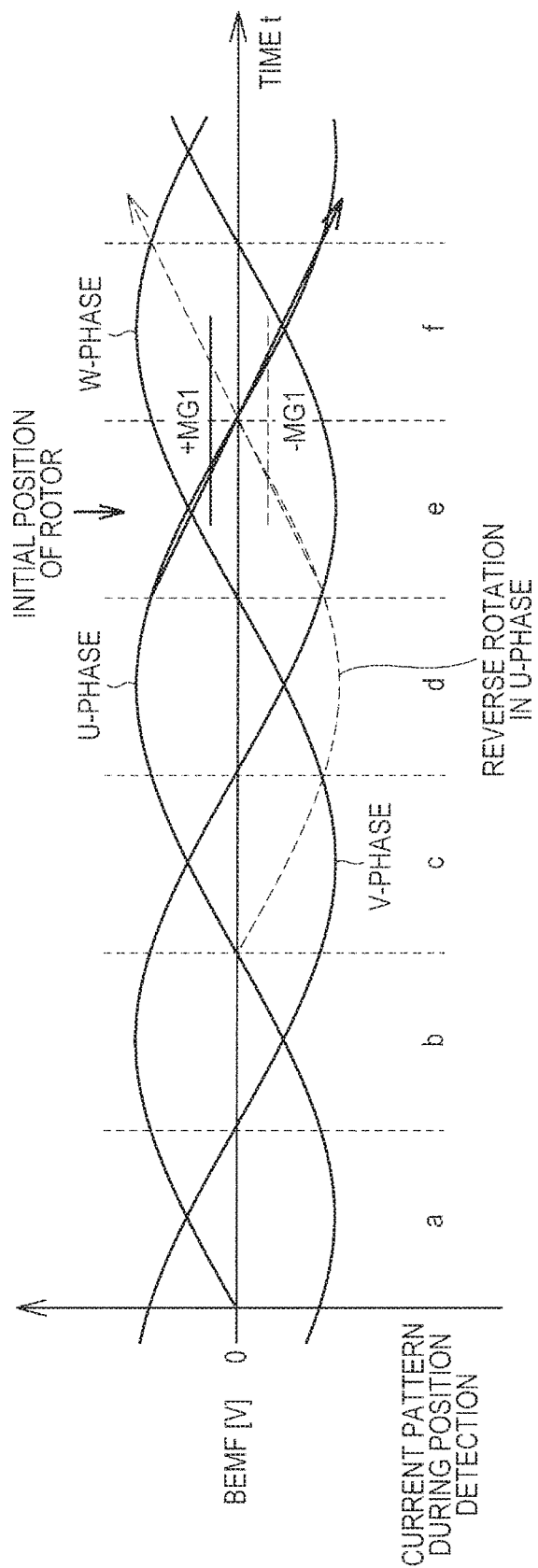
FIG. 14 is a diagram illustrating temporal changes in back electromotive force generated in a non-conducting phase.

FIG. 14 is a diagram illustrating temporal changes in back electromotive force generated in a non-conducting phase. FIG. 14 depicts a current pattern that corresponds to the initial position of the rotor during inductive sensing. When it is assumed that the maximum motor current value is obtained in the current pattern e during inductive sensing, the drive current for a kick flows from the W-phase to the V-phase so that back electromotive force generated in the U-phase, which is a non-conducting phase, is detected.

If the back electromotive force generated in this instance is positive, it signifies that the back electromotive force is higher than a voltage at the midpoint 132 of the brushless DC motor 130 (or a voltage at the virtual midpoint 162). If, by contrast, the generated back electromotive force is negative, it signifies that the back electromotive force is lower than the voltage at the midpoint 132 of the brushless DC motor 130 (or the voltage at the virtual midpoint 162).

As is the case with FIG. 8, the back electromotive force in the U-phase has a positive value at the initial position of the rotor, but changes to a negative value when the rotor rotates. Therefore, the back electromotive force is negative when it is compared with the threshold value (margin MG1). That is to say, the analog-to-digital converted value of the back electromotive force is smaller than the central value. Consequently, when the value obtained by subtracting the analog-to-digital converted value of the back electromotive force from the central value is greater than the margin MG1, a back electromotive force greater than the threshold value is generated (this instance corresponds to step S142 in FIG. 16). The central value corresponds to the voltage at the midpoint 132 of the brushless DC motor 130 or at the virtual midpoint 162.

Meanwhile, if the rotor is rotating in the reverse direction, as indicated by the broken line in FIG. 14, the back electromotive force in the U-phase has a negative value at the initial position of the rotor, but changes to a positive value when the rotor rotates. Therefore, the back electromotive force is positive when it is compared with a threshold value (margin MG2). That is to say, the analog-to-digital converted value of the back electromotive force is greater than the central value. Consequently, when the value obtained by subtracting the central value from the analog-to-digital converted value of the back electromotive force is greater than the margin MG2, a back electromotive force greater than the threshold value is generated (this instance corresponds to step S143 in FIG. 16).

The accuracy requirements for determining whether or not the rotation direction is reverse are not so high. Therefore, the margin MG2 is set to a value smaller than for the margin MG1. If, for example, the margin MG1 is set to 20 LSB, the margin MG2 is set to approximately 5 LSB.

FIG. 15 is a diagram illustrating, in tabular form, voltage changes in a non-conducting phase in each of various current patterns. FIG. 15 depicts a current pattern corresponding to a rotor position detected during inductive sensing, a drive current pattern during a kick, and the direction of change in the sign of back electromotive force generated in a non-conducting phase.

As illustrated in FIG. 15, the back electromotive force changes from positive to negative if the drive current pattern for a kick is a, c, or e. If, by contract, the drive current pattern for a kick is b, d, or f, back electromotive force changes from negative to positive. However, it is well to remember that the above changes in the back electromotive force are reversed if, for example, the rotation direction of the rotor or the winding direction of the stator windings 131 is changed.

Details of Step S140A in FIG. 13

Figure 16:
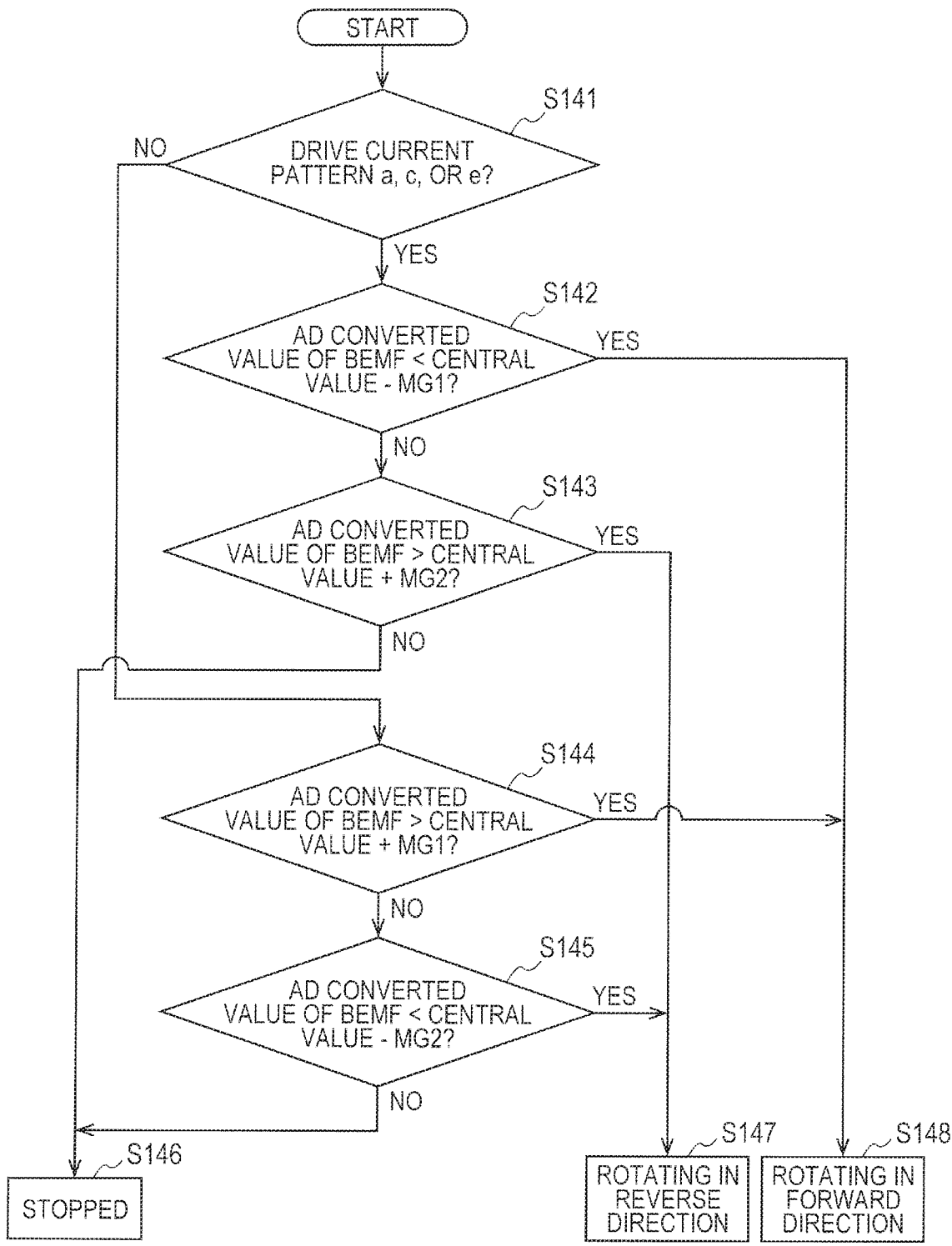
FIG. 16 is a more detailed flowchart illustrating step S140A in FIG. 13.

FIG. 16 is a more detailed flowchart illustrating step S140A in FIG. 13. The foregoing description will now be summarized with reference to FIGS. 1 and 16.

The MCU 110 uses either a first determination procedure or a second determination procedure in accordance with the drive current pattern for a kick (step S141).

The first determination procedure is used when the drive current pattern is a, c, or e (YES at step S141). In this instance, if the analog-to-digital converted value of back electromotive force is smaller than the central value minus MG1 (YES at step S142), the MCU 110 determines that the rotor is rotating in the forward direction (step S148). Meanwhile, if the analog-to-digital converted value of back electromotive force is greater than the central value plus MG2 (YES at step S143), the MCU 110 determines that the rotor is rotating in the reverse direction (step S147). If neither of the above two cases applies (NO at step S142 and NO at step S143), the MCU 110 determines that the rotor is stopped (step S146).

The second determination procedure is used when the drive current pattern is b, d, or f (NO at step S141). In this instance, if the analog-to-digital converted value of back electromotive force is greater than the central value plus MG1 (YES at step S144), the MCU 110 determines that the rotor is rotating in the forward direction (step S148). Meanwhile, if the analog-to-digital converted value of back electromotive force is smaller than the central value minus MG2 (YES at step S145), the MCU 110 determines that the rotor is rotating in the reverse direction (step S147). If neither of the above two cases applies (NO at step S144 and NO at step S145), the MCU 110 determines that the rotor is stopped (step S146).

It is well to remember that YES and NO in step S141 need to be interchanged if, for example, the rotation direction of the rotor, the winding direction of the stator windings 131, or the wiring direction of the stator windings 131 (whether the rotor side is regarded as the midpoint 132 or as a terminal) is reversed.

Advantages of Second Embodiment

The motor drive system according to the second embodiment focuses attention not only on the magnitude of back electromotive force but also on the sign of back electromotive force in order to determine whether the rotor is rotating in the forward direction or in the reverse direction. There-fore, even if inductive sensing is erroneously performed due, for instance, to disturbance, and the rotor is later determined to be rotating in the reverse direction, inductive sensing can be immediately performed again. As a result, the starting torque can be generated in a more stable manner.

While the present disclosure made by the inventors has been described in detail in terms of particular embodiments, the present disclosure is not limited to the foregoing embodiments. It is to be understood by those skilled in the art that various modifications can be made without departing from the spirit and scope of the present disclosure.

What is claimed is:

1. A semiconductor device adapted to control an inverter circuit that drives a three-phase motor, the semiconductor device comprising:
   a detector that is coupled to output nodes in various phases of the inverter circuit adapted to output a motor voltage, and detects back electromotive force generated in an output node that is in a non-conducting phase and among the output nodes of the various phases; and
   a controller that controls the inverter circuit,
   wherein the controller detects a position of a rotor in the three-phase motor during a start-up operation of the three-phase motor, and controls the inverter circuit so as to apply a drive current to two out of three phases of the three-phase motor in accordance with the detected position of the rotor,
   wherein the controller changes a time of application of the drive current in accordance with a rotation speed of the rotor, and
   wherein the controller changes the time of application of the drive current in accordance with a magnitude of the back electromotive force that is in a non-conducting phase and detected by the detector.

2. The semiconductor device according to claim 1,
   wherein the controller executes a combination of the detection of the position of the rotor and the application of the drive current one or more times during the start-up operation of the three-phase motor, and
   wherein the controller changes the number of executions of the combination in accordance with the magnitude of the back electromotive force detected by the detector.

3. The semiconductor device according to claim 2, wherein the controller controls the inverter circuit so as to stop the application of the drive current when the magnitude of the back electromotive force exceeds a first threshold value.

4. The semiconductor device according to claim 3, wherein, if the magnitude of the back electromotive force does not exceed the first threshold value even when a first reference time elapses since a start of the application of the drive current, the controller stops the application of the drive current, detects the position of the rotor in the three-phase motor again, and controls the inverter circuit so as to apply the drive current again to two out of three phases of the three-phase motor in accordance with the detected position of the rotor.

5. The semiconductor device according to claim 4, wherein the controller ends the start-up operation if an interval between an instant at which the application of the drive current starts and an instant at which the magnitude of the back electromotive force exceeds the first threshold value is not longer than a second reference time, and controls the inverter circuit so as to operate the three-phase motor in accordance with a zero-crossing point of the back electromotive force.

6. The semiconductor device according to claim 5, wherein the controller detects the position of the rotor in the three-phase motor again if the interval between the instant at which the application of the drive current starts and the instant at which the magnitude of the back electromotive force exceeds the first threshold value is longer than the second reference time and shorter than the first reference time, and controls the inverter circuit so as to apply the drive current again to two out of three phases of the three-phase motor in accordance with the detected position of the rotor.

7. The semiconductor device according to claim 6,
wherein the controller compares the magnitude of the back electromotive force with the first threshold value after a third reference time elapses since the start of the application of the drive current, and
wherein the third reference time is shorter than the second reference time.

8. The semiconductor device according to claim 2, wherein, depending on whether a positive or negative difference exists between the back electromotive force and a reference voltage corresponding to a midpoint voltage of the three-phase motor, the controller determines whether the rotor is rotating in a forward direction or in a reverse direction.

9. The semiconductor device according to claim 8, wherein, if the rotor is determined to be rotating in the reverse direction, the controller stops the application of the drive current, detects the position of the rotor in the three-phase motor again, and controls the inverter circuit so as to apply the drive current again to two out of three phases of the three-phase motor in accordance with the detected position of the rotor.

10. The semiconductor device according to claim 8, wherein the controller compares the difference between the back electromotive force and the reference voltage with a first threshold value in order to determine whether the rotor is rotating in the forward direction, and compares the difference between the back electromotive force and the reference voltage with a second threshold value in order to determine whether the rotor is rotating in the reverse direction, the second threshold value being smaller than the first threshold value.

11. A motor drive system comprising:
a three-phase motor;
an inverter circuit that drives the three-phase motor; and
a semiconductor device that controls the inverter circuit,
wherein the semiconductor device includes
a detector that is coupled to output nodes in various phases of the inverter circuit adapted to output a motor voltage, and detects back electromotive force generated in an output node that is in a non-conducting phase and among the output nodes of the various phases, and
a controller that controls the inverter circuit,
wherein the controller detects a position of a rotor in the three-phase motor during a start-up operation of the three-phase motor, and controls the inverter circuit so as to apply a drive current to two out of three phases of the three-phase motor in accordance with the detected position of the rotor,
wherein the controller changes a time of application of the drive current in accordance with a rotation speed of the rotor, and wherein the controller changes the time of application of the drive current in accordance with a magnitude of the back electromotive force that is in a non-conducting phase and detected by the detector.

12. The motor drive system according to claim 11,
wherein the controller executes a combination of the detection of the position of the rotor and the application of the drive current one or more times during the start-up operation of the three-phase motor, and
wherein the controller changes the number of executions of the combination in accordance with the magnitude of the back electromotive force detected by the detector.

13. A motor control computer-readable storage medium that causes a computer to execute the steps of:
detecting a position of a rotor in a three-phase motor by performing inductive sensing during a start-up operation of the three-phase motor;
starting to apply a drive current to two out of three phases of the three-phase motor by an inverter circuit in accordance with the detected position of the rotor during a start-up operation of the three-phase motor; and
stopping application of the drive current by the inverter circuit in accordance with a rotation speed of the rotor and a magnitude of back electromotive force that is in a non-conducting phase and detected during the application of the drive current.

14. The motor control computer-readable storage medium according to claim 13,
wherein the step of stopping the application of the drive current includes the steps of:
causing the inverter circuit to stop the application of the drive current when the magnitude of back electromotive force in the non-conducting phase exceeds a first threshold value, and
stopping the application of the drive current if the magnitude of the back electromotive force in the non-conducting phase does not exceed the first threshold value even when a first reference time elapses.

15. The motor control computer-readable storage medium according to claim 14 that causes the computer to further execute the step of:
ending the start-up operation if an interval between an instant at which the application of the drive current starts and an instant at which the magnitude of the back electromotive force exceeds the first threshold value is not longer than a second reference time, and causing the inverter circuit to operate the three-phase motor in accordance with a zero-crossing point of the back electromotive force.

16. The motor control computer-readable storage medium according to claim 15 that, if the interval between the instant at which the application of the drive current starts and the instant at which the magnitude of the back electromotive force exceeds the first threshold value is longer than the second reference time and shorter than the first reference time, causes the computer to re-execute the steps of:
detecting the position of the rotor; and
starting to apply the drive current.

* * * * *